United States Patent
Kuusilinna et al.

(10) Patent No.: US 9,755,437 B2
(45) Date of Patent: Sep. 5, 2017

(54) METHOD, APPARATUS, AND COMPUTER PROGRAM PRODUCT FOR WIRELESS CHARGING DETECTION

(75) Inventors: Kimmo Kalervo Kuusilinna, Tampere (FI); Arto Tapio Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 494 days.

(21) Appl. No.: 13/455,561

(22) Filed: Apr. 25, 2012

(65) Prior Publication Data

US 2013/0288600 A1    Oct. 31, 2013

(51) Int. Cl.
| | |
|---|---|
| H02J 7/00 | (2006.01) |
| H02J 7/02 | (2016.01) |
| H04W 4/00 | (2009.01) |
| H04B 5/00 | (2006.01) |

(52) U.S. Cl.
CPC ........... *H02J 7/0004* (2013.01); *H02J 7/025* (2013.01); *H02J 2007/0001* (2013.01); *H04B 5/0037* (2013.01); *H04W 4/008* (2013.01)

(58) Field of Classification Search
CPC .......... H04B 5/02; H04B 5/0012; H04B 5/00; H04B 5/0037; H04B 17/23; H04M 2250/02; H04M 1/72583; H04W 88/06; H04W 76/02; H04W 4/008; H02J 7/0004; H02J 7/025; H02J 2007/0001; H04L 25/02
See application file for complete search history.

(56) References Cited

U.S. PATENT DOCUMENTS

| | | | |
|---|---|---|---|
| 6,987,975 B1 | 1/2006 | Irvin et al. | |
| 7,155,210 B2 * | 12/2006 | Benson | 455/414.2 |
| 7,512,685 B2 | 3/2009 | Lunsford et al. | |
| 7,606,578 B2 | 10/2009 | Irvin et al. | |

(Continued)

FOREIGN PATENT DOCUMENTS

WO    WO2011062827    5/2011

OTHER PUBLICATIONS

B. Johns; An introduction to the Wireless Power Consortium standard and TI's complaint solutions; Power Management; Texas Instruments Incorporated; High-Performance Analog Products; ww.ti.com/aaj; 1Q 2011; Analog Applications Journal; pp. 11-12.

*Primary Examiner* — Alejandro Rivero
*Assistant Examiner* — Maryam Soltanzadeh
(74) *Attorney, Agent, or Firm* — Locke Lord LLP

(57) ABSTRACT

Method, apparatus, and computer program product example embodiments provide wireless charging detection. According to an example embodiment of the invention, a method comprises advertising by a wireless charging device, an availability for wireless charging over a wireless communication interface; scanning, by the wireless charging device, for wireless signals from one or more other wireless devices; providing, by the wireless charging device, information usable for characterizing charging capabilities of the wireless charging device; transmitting, by the wireless charging device, one or more wireless communication packets over the wireless communication interface, including the information usable for characterizing the charging capabilities of (Continued)

the wireless charging device, in response to receiving one or more wireless signals from the one or more other wireless devices; and providing, by the wireless charging device, power to the one or more other wireless devices over a wireless power interface.

23 Claims, 14 Drawing Sheets

(56) References Cited

U.S. PATENT DOCUMENTS

| | | | |
|---|---|---|---|
| 7,812,573 B2 * | 10/2010 | Bersenev | 320/166 |
| 7,986,917 B2 | 7/2011 | Ahlgren et al. | |
| 8,165,523 B2 | 4/2012 | Makela et al. | |
| 8,284,061 B1 | 10/2012 | Dione | |
| 8,717,044 B2 * | 5/2014 | Sims | H02J 7/042 324/691 |
| 8,929,810 B2 * | 1/2015 | Frankland | H04B 5/00 455/41.1 |
| 2003/0220114 A1 | 11/2003 | Langensteiner et al. | |
| 2004/0142690 A1 | 7/2004 | Eom et al. | |
| 2004/0162059 A1 | 8/2004 | Hiltunen et al. | |
| 2005/0020322 A1 | 1/2005 | Ruuska et al. | |
| 2005/0156712 A1 | 7/2005 | Jyrinki | |
| 2006/0229113 A1 | 10/2006 | Rowse | |
| 2007/0096691 A1 * | 5/2007 | Duncan | G06F 1/263 320/114 |
| 2008/0081608 A1 | 4/2008 | Findikli et al. | |
| 2008/0296978 A1 | 12/2008 | Finkenzeller et al. | |
| 2009/0108805 A1 | 4/2009 | Liu et al. | |
| 2010/0081376 A1 | 4/2010 | Emura | |
| 2010/0105324 A1 | 4/2010 | Takayama | |
| 2010/0213895 A1 * | 8/2010 | Keating | H02J 7/02 320/108 |
| 2010/0250135 A1 | 9/2010 | Li et al. | |
| 2010/0291952 A1 | 11/2010 | Gosset et al. | |
| 2011/0050164 A1 | 3/2011 | Partovi et al. | |
| 2011/0050168 A1 * | 3/2011 | Yoo et al. | 320/109 |
| 2011/0057606 A1 | 3/2011 | Saunamaki | |
| 2011/0115429 A1 | 5/2011 | Toivola et al. | |
| 2011/0115430 A1 | 5/2011 | Saunamaki | |
| 2011/0279244 A1 * | 11/2011 | Park et al. | 340/10.34 |
| 2013/0257364 A1 * | 10/2013 | Redding | H02J 5/005 320/108 |

* cited by examiner

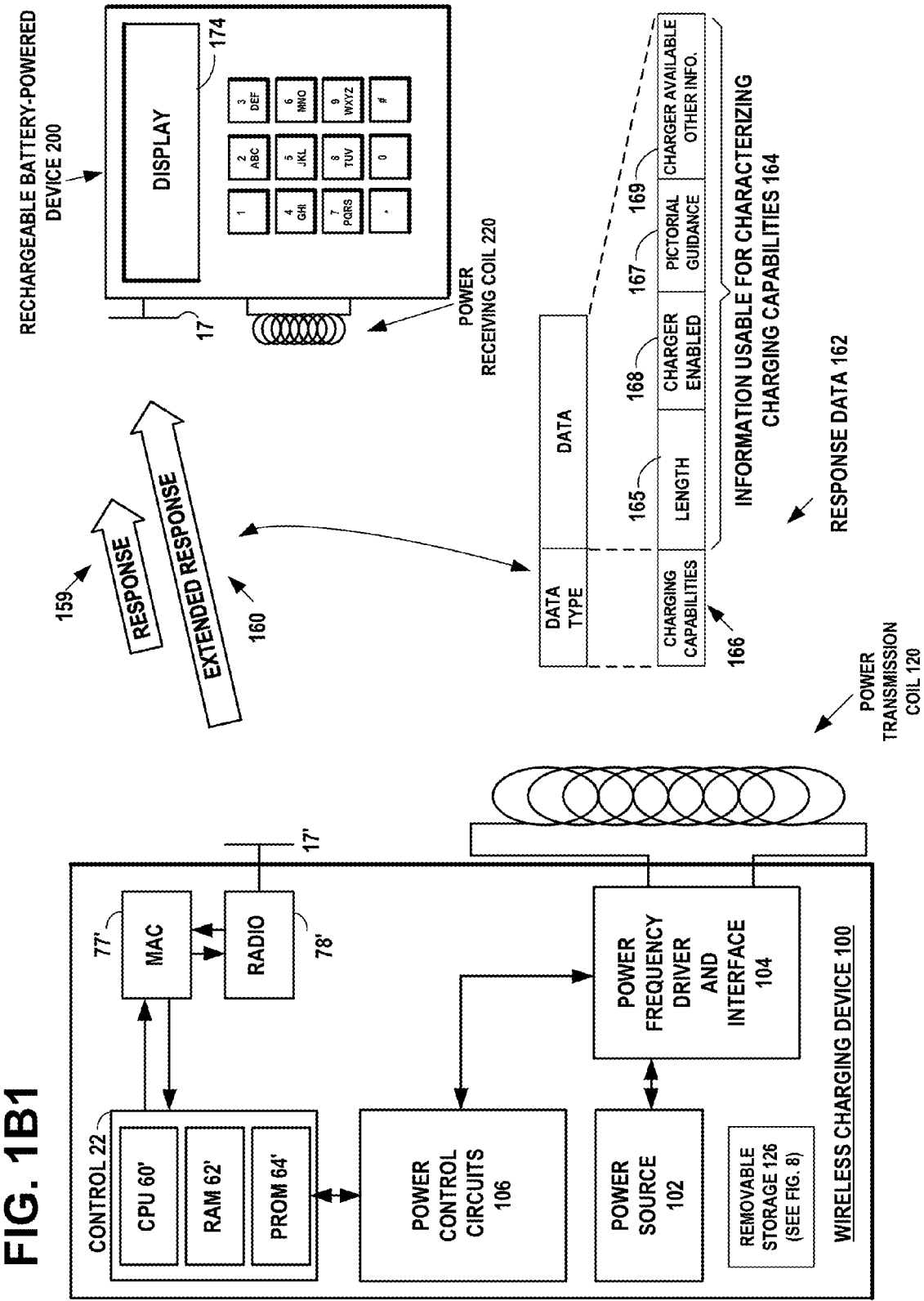
FIG. 1B1

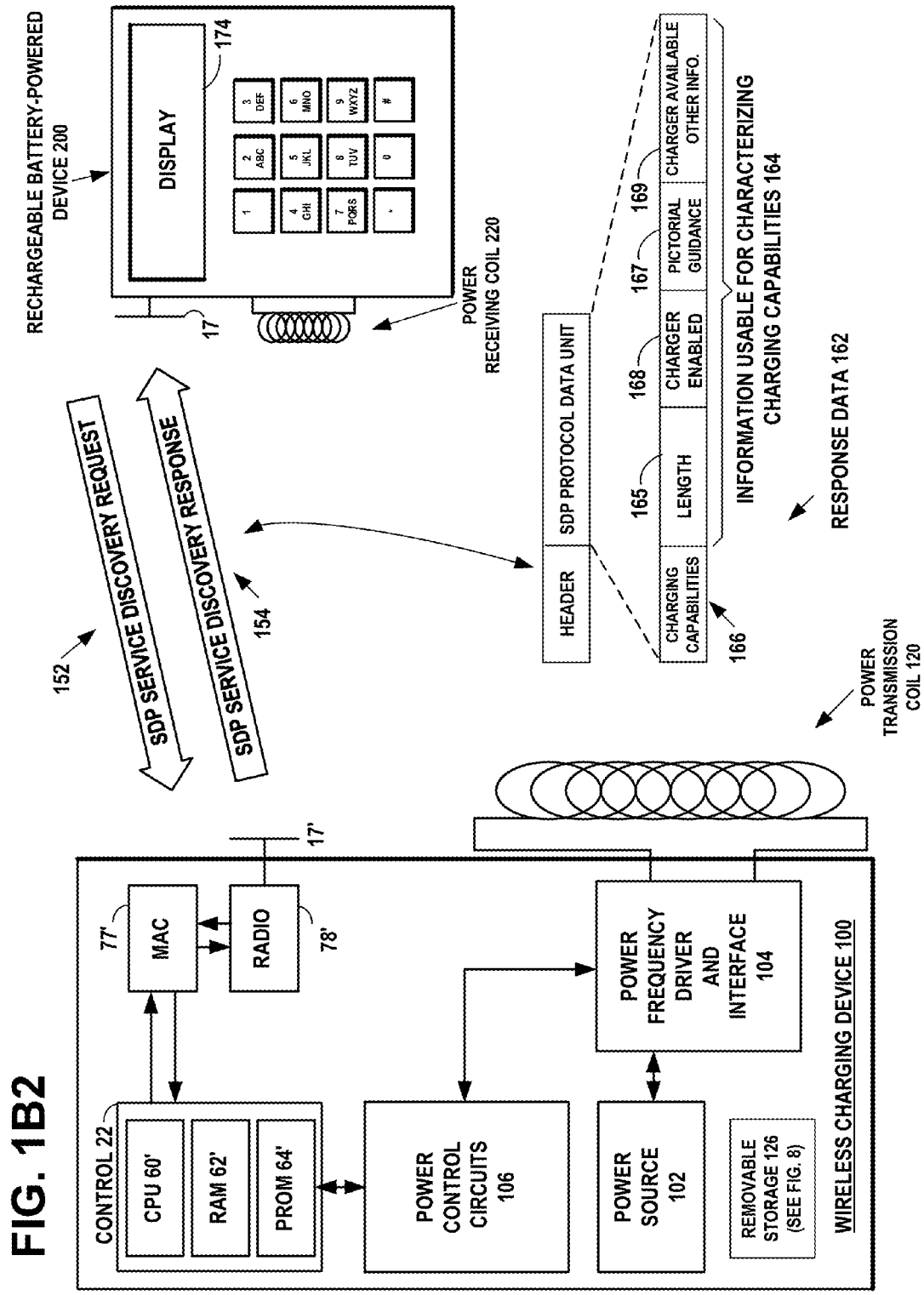
FIG. 1B2

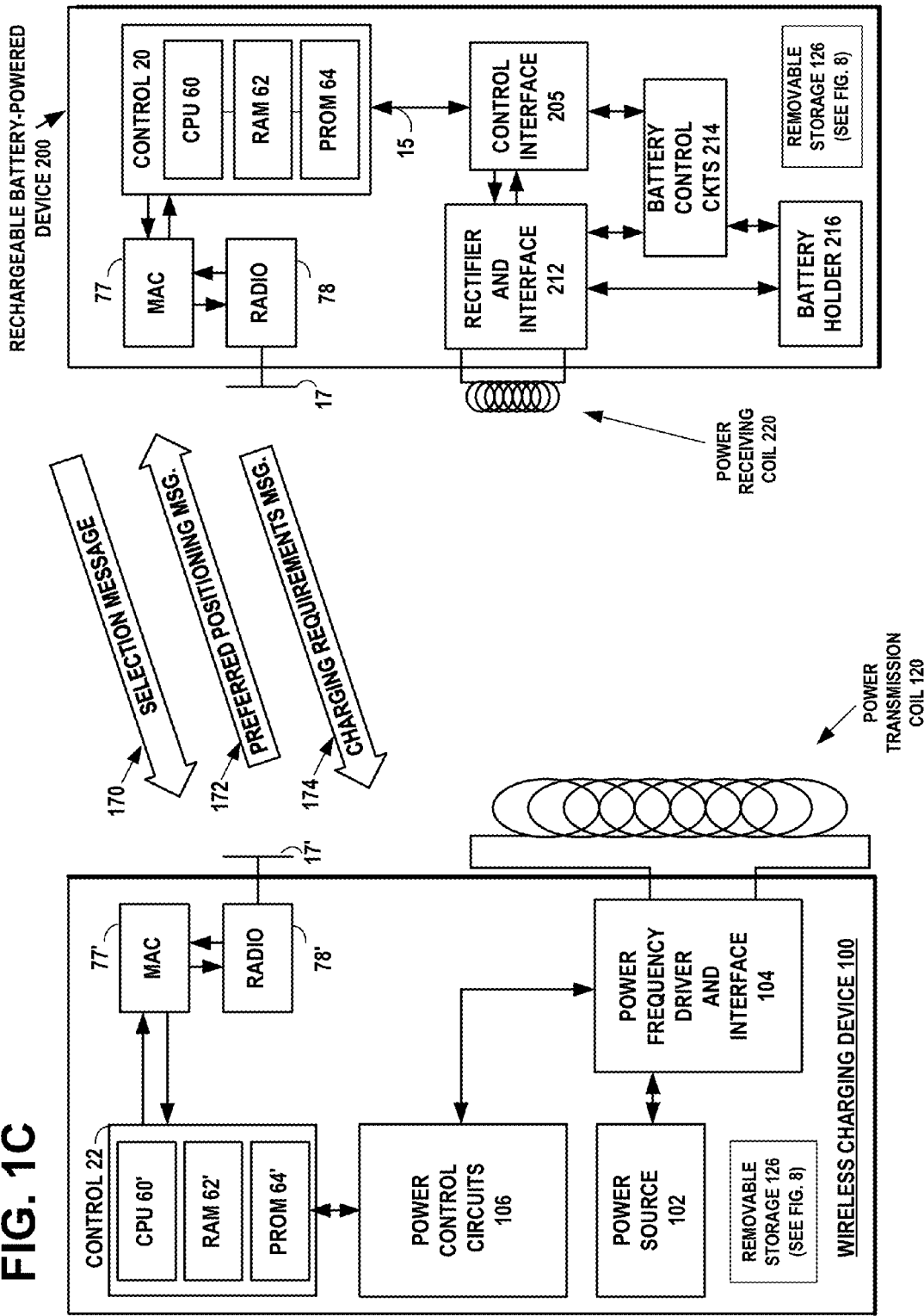

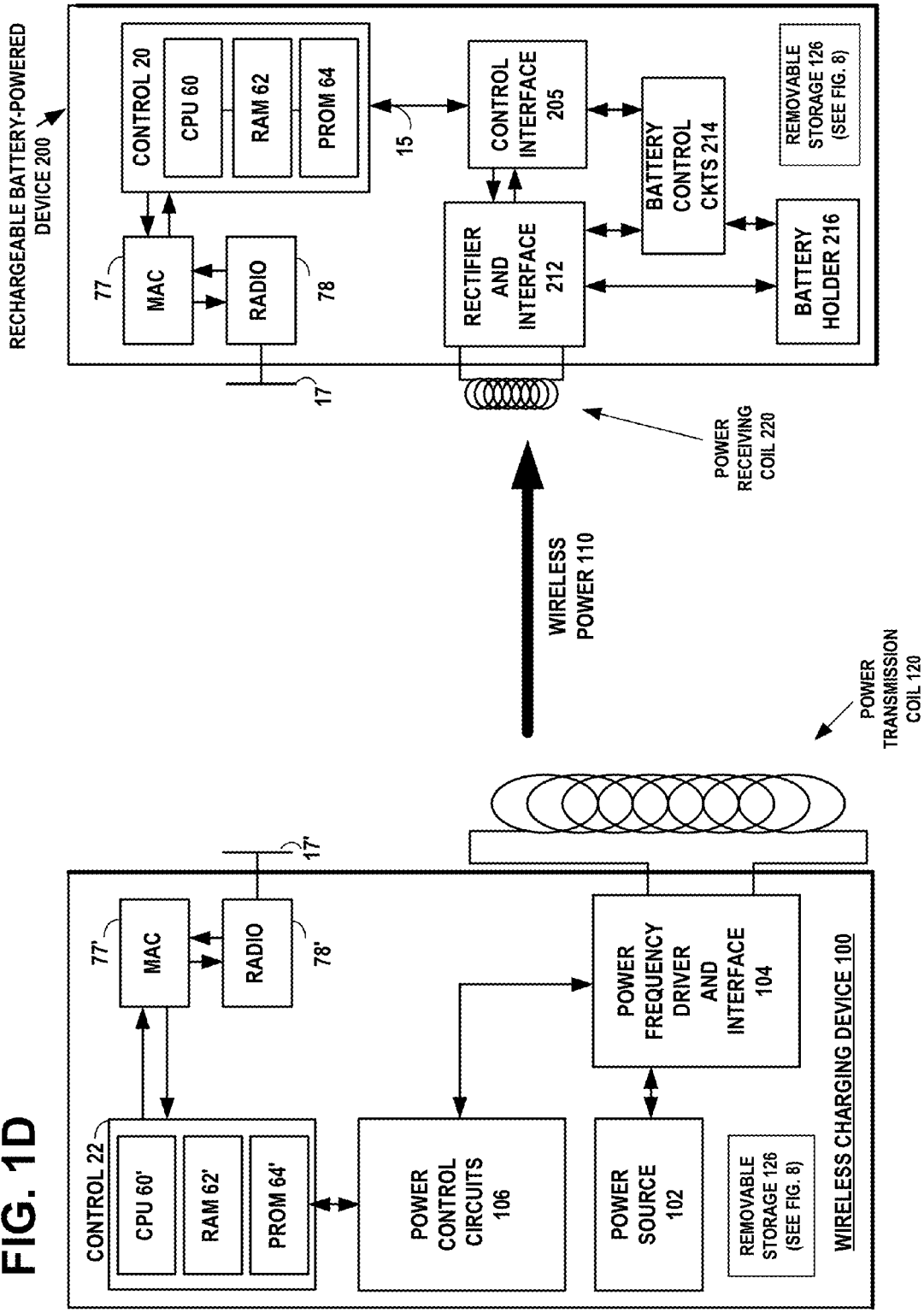

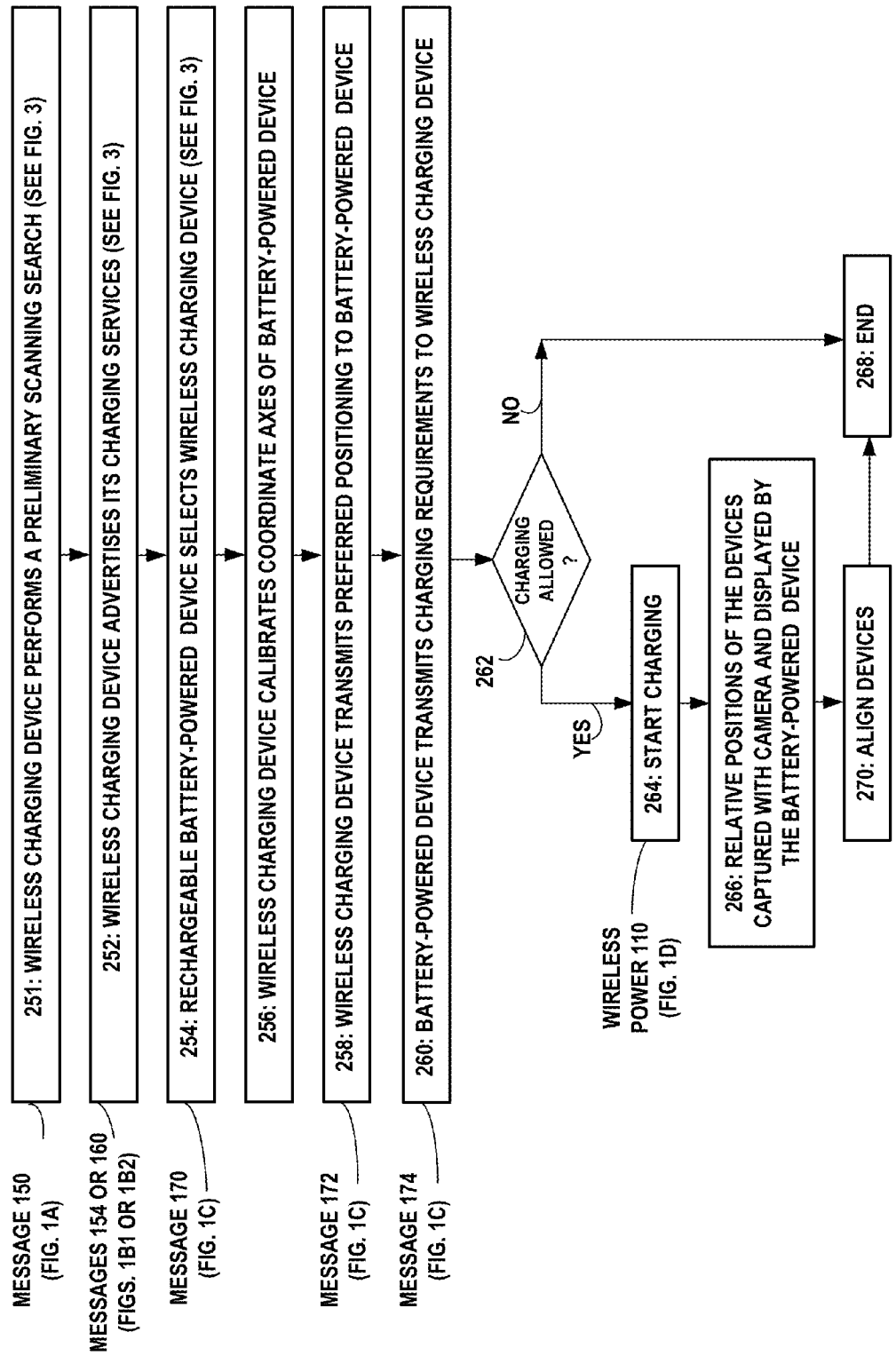

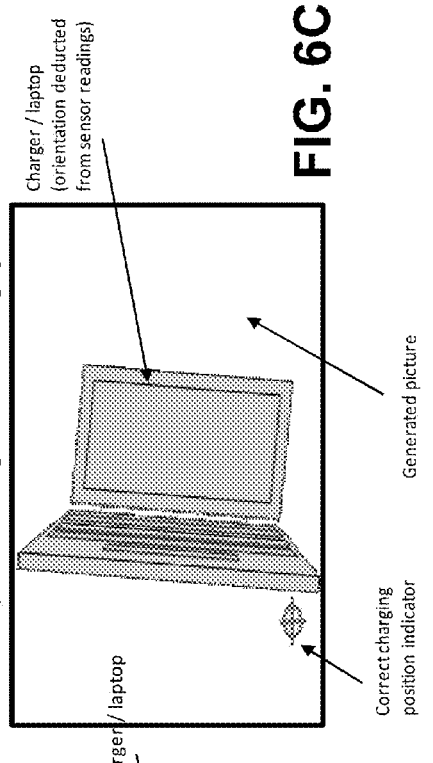
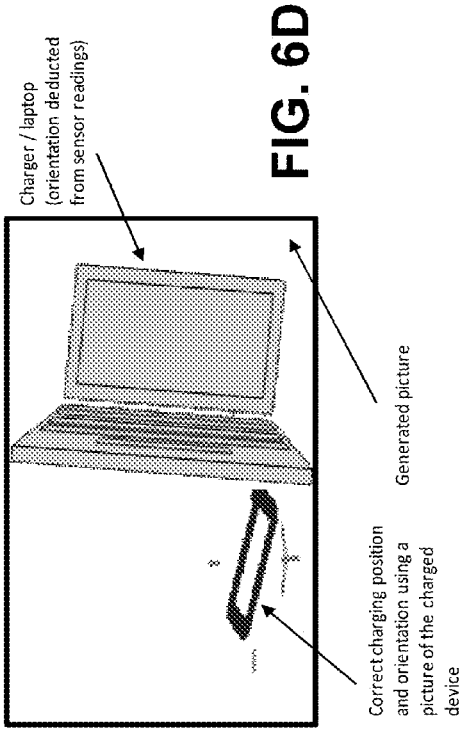
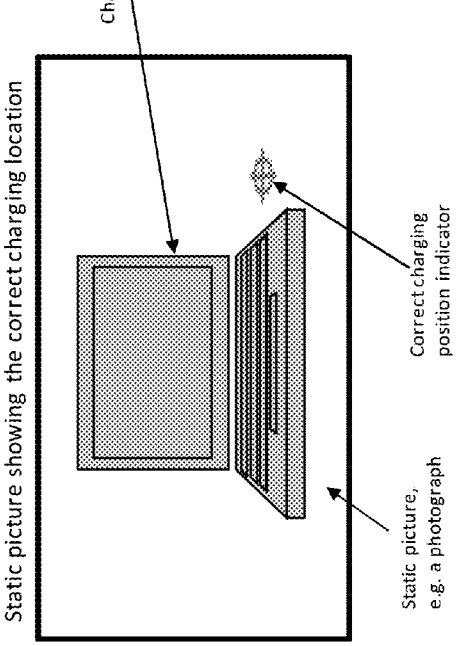
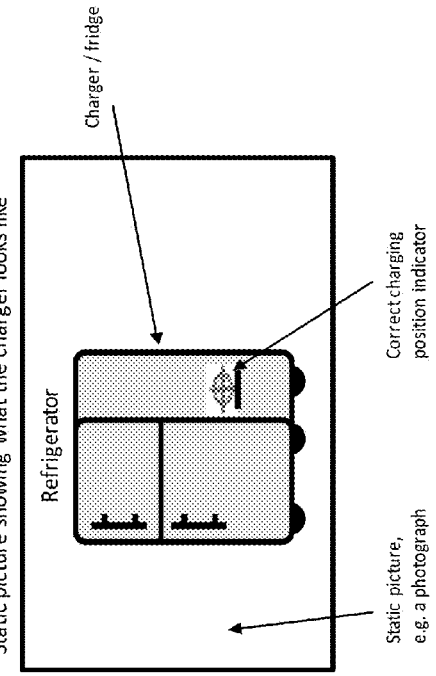
FIG. 6A
FIG. 6B
FIG. 6C
FIG. 6D

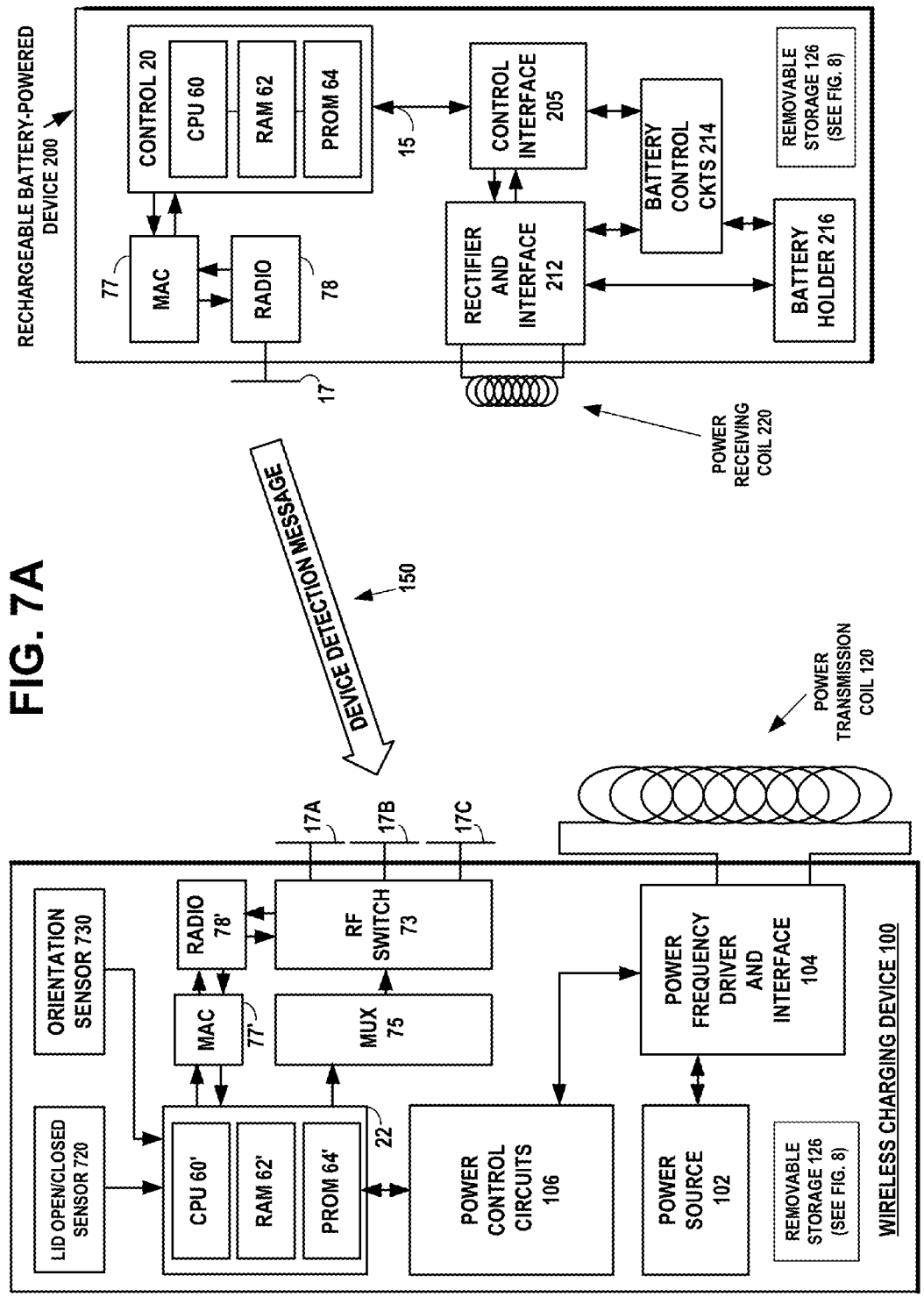

METHOD, APPARATUS, AND COMPUTER PROGRAM PRODUCT FOR WIRELESS CHARGING DETECTION

FIELD

The field of the invention relates to wireless short-range communication and more particularly to wireless charging detection.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. *Bluetooth™ Specification version 2.0+EDR*, published Oct. 15, 2004 has the original functional characteristics of the first version Bluetooth™ Basic Rate (BR) and adds the Enhanced Data Rate (EDR) feature. *Bluetooth™ Specification version 2.1+EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. *Bluetooth™ Specification version 3.0+HS*, published Apr. 21, 2009, updated the standard to integrate the Alternate MAC/PHY and Unicast Connectionless Data features.

On Jun. 30, 2010, the Bluetooth™ SIG published the *Bluetooth™ Core Specification, Version* 4.0 (incorporated herein by reference), which includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments provide wireless charging detection.

An example embodiment of the invention includes a method comprising:

advertising by a wireless charging device, an availability for wireless charging over a wireless communication interface;

scanning, by the wireless charging device, for wireless signals from one or more other wireless devices;

providing, by the wireless charging device, information usable for characterizing charging capabilities of the wireless charging device;

transmitting, by the wireless charging device, one or more wireless communication packets over the wireless communication interface, including the information usable for characterizing the charging capabilities of the wireless charging device, in response to receiving one or more wireless signals from the one or more other wireless devices; and providing, by the wireless charging device, power to the one or more other wireless devices over a wireless power interface.

An example embodiment of the invention includes a method comprising:

determining, by the wireless charging device, whether charging is available in the wireless charging device; and discontinuing said advertising, in response to determining that charging is at least temporarily unavailable.

An example embodiment of the invention includes a method comprising:

wherein the one or more wireless communication packets include a Bluetooth™ extended inquiry response packet.

An example embodiment of the invention includes a method comprising:

wherein the one or more wireless communication packets include a Bluetooth™ service discovery protocol packet.

An example embodiment of the invention includes a method comprising:

wherein the one or more wireless communication packets include a Bluetooth™ extended inquiry response packet that includes a data type indication to inform a receiving device that the information usable for characterizing charging capabilities of the wireless charging device exists.

An example embodiment of the invention includes a method comprising:

wherein the one or more wireless communication packets include a Bluetooth™ FHS packet including an indication that the information usable for characterizing charging capabilities of the wireless charging device exists in a subsequent packet.

An example embodiment of the invention includes a method comprising:

wherein the information usable for characterizing charging capabilities of the wireless charging device includes one or more of wireless charging capability, status of charger, pictorial guidance information, wireless charging position, charger enabled status, or charger disabled status.

An example embodiment of the invention includes a method comprising:

receiving, by an apparatus, from a wireless charging device over a wireless communication interface, one or more wireless communication packets including information usable for characterizing charging capabilities of the wireless charging device;

generating, by the apparatus, charging requirements data for a rechargeable battery in the apparatus, in response to the received information usable for characterizing charging capabilities of the wireless charging device;

transmitting, by the apparatus, to the wireless charging device over the wireless communication interface, one or more wireless communication packets including the charging requirements data; and receiving, by the apparatus, from the wireless charging device, power over a wireless power interface.

An example embodiment of the invention includes a method comprising:

scanning, by the apparatus, for wireless communication signals indicating presence of a wireless charging device, at a scanning rate based on a charged state of the rechargeable battery in the apparatus.

An example embodiment of the invention includes a method comprising:

transmitting, by the apparatus, wireless advertising signals requesting service by a wireless charging device, when the charged state of the rechargeable battery in the apparatus is less than a threshold value.

An example embodiment of the invention includes a method comprising:

displaying, by the apparatus, guidance for positioning the apparatus with respect to the wireless charging device, based on the information usable for characterizing charging capabilities of the wireless charging device.

An example embodiment of the invention includes a method comprising:

wherein the one or more wireless communication packets including information usable for characterizing charging capabilities of the wireless charging device includes a Bluetooth™ extended inquiry response packet.

An example embodiment of the invention includes a method comprising:

wherein the one or more wireless communication packets including information usable for characterizing charging capabilities of the wireless charging device includes a Bluetooth™ service discovery protocol packet.

An example embodiment of the invention includes a method comprising:

wherein the one or more wireless communication packets including information usable for characterizing charging capabilities of the wireless charging device includes a Bluetooth™ extended inquiry response packet that includes a data type indication to inform the apparatus that the information usable for characterizing charging capabilities of the remote device exists.

An example embodiment of the invention includes a method comprising:

wherein the information usable for characterizing charging capabilities of the wireless charging device includes one or more of wireless charging capability, status of charger, pictorial guidance information, wireless charging position, charger enabled status, or charger disabled status.

An example embodiment of the invention includes an apparatus comprising:

at least one processor;

at least one memory including computer program code;

the at least one memory and the computer program code configured to, with the at least one processor, cause the apparatus at least to:

advertise an availability for wireless charging over a wireless communication interface;

scan for wireless signals from one or more other wireless devices;

provide information usable for characterizing charging capabilities of the wireless charging device;

transmit one or more wireless communication packets over the wireless communication interface, including the information usable for characterizing the charging capabilities of the wireless charging device, in response to receiving one or more wireless signals from the one or more other wireless devices; and provide power to the one or more other wireless devices over a wireless power interface.

An example embodiment of the invention includes an apparatus comprising:

the at least one memory and the computer program code configured to, with the at least one processor, cause the apparatus at least to:

determine whether charging is available in the apparatus; and discontinue said advertising, in response to determining that charging is at least temporarily unavailable.

An example embodiment of the invention includes an apparatus comprising:

at least one processor;

at least one memory including computer program code;

the at least one memory and the computer program code configured to, with the at least one processor, cause the apparatus at least to:

receive from a wireless charging device over a wireless communication interface, one or more wireless communication packets including information usable for characterizing charging capabilities of the wireless charging device;

generate charging requirements data for a rechargeable battery in the apparatus, in response to the received information usable for characterizing charging capabilities of the wireless charging device;

transmit to the wireless charging device over the wireless communication interface, one or more wireless communication packets including the charging requirements data; and receive from the wireless charging device, power over a wireless power interface.

An example embodiment of the invention includes an apparatus comprising:

the at least one memory and the computer program code configured to, with the at least one processor, cause the apparatus at least to:

scan for wireless communication signals indicating presence of a wireless charging device, at a scanning rate based on a charged state of the rechargeable battery in the apparatus.

An example embodiment of the invention includes an apparatus comprising:

the at least one memory and the computer program code configured to, with the at least one processor, cause the apparatus at least to:

transmit wireless advertising signals requesting service by a wireless charging device, when the charged state of the rechargeable battery in the apparatus is less than a threshold value.

An example embodiment of the invention includes an apparatus comprising:

the at least one memory and the computer program code configured to, with the at least one processor, cause the apparatus at least to:

display guidance for positioning the apparatus with respect to the wireless charging device, based on the information usable for characterizing charging capabilities of the wireless charging device.

An example embodiment of the invention includes a computer program product comprising computer executable program code recorded on a computer readable non-transitory storage medium, the computer executable program code comprising:

code for advertising, by a wireless charging device, an availability for wireless charging over a wireless communication interface;

code for scanning, by the wireless charging device, for wireless signals from one or more other wireless devices;

code for providing, by the wireless charging device, information usable for characterizing charging capabilities of the wireless charging device;

code for transmitting, by the wireless charging device, one or more wireless communication packets over the wireless communication interface, including the information usable for characterizing the charging capabilities of the wireless charging device, in response to receiving one or more wireless signals from the one or more other wireless devices; and code for providing, by the wireless charging device, power to the one or more other wireless devices over a wireless power interface.

An example embodiment of the invention includes a computer program product comprising computer executable program code recorded on a computer readable non-transitory storage medium, the computer executable program code comprising:

code for receiving, by an apparatus, from a wireless charging device over a wireless communication interface, one or more wireless communication packets including information usable for characterizing charging capabilities of the wireless charging device;

code for generating, by the apparatus, charging requirements data for a rechargeable battery in the apparatus, in response to the received information usable for characterizing charging capabilities of the wireless charging device;

code for transmitting, by the apparatus, to the wireless charging device over the wireless communication interface, one or more wireless communication packets including the charging requirements data; and code for receiving, by the apparatus, from the wireless charging device, power over a wireless power interface.

The example embodiments of the invention provide wireless charging detection.

DESCRIPTION OF THE FIGURES

FIG. 1B1 discloses the example network diagram of FIG. 1A, of the wireless charging device responding to an inquiry packet from the rechargeable battery-powered Bluetooth™ device, by providing information usable for characterizing charging capabilities of the wireless charging device. In embodiments of the invention, the wireless charging device in inquiry scanning mode may transmit the extended inquiry response (EIR) packet with the information usable for characterizing charging capabilities of the wireless charging device, in a normal Bluetooth™ transmission, in accordance with at least one embodiment of the present invention.

FIG. 1B2 discloses an alternate example network diagram of FIG. 1A, of the wireless charging device responding to an SDP Service Search Attribute Request packet from the rechargeable battery-powered Bluetooth™ device, by providing a SDP Service Search Attribute Response packet including information usable for characterizing charging capabilities of the wireless charging device. In embodiments of the invention, the wireless charging device may transmit the SDP Service Search Attribute Response packet with the information usable for characterizing charging capabilities of the wireless charging device, in a normal Bluetooth™ transmission, in accordance with at least one embodiment of the present invention.

FIG. 1C illustrates the example network diagram of FIGS. 1A and 1B1, after the rechargeable battery-powered Bluetooth™ device has received the extended inquiry response packet including the information usable for characterizing charging capabilities of the wireless charging device and determining that the extended inquiry response packet includes information usable for characterizing charging capabilities of the wireless charging device, in accordance with at least one embodiment of the present invention. In embodiments of the invention, the rechargeable battery-powered Bluetooth™ device responds with a selection message indicating its selection of the wireless charging device. In embodiments of the invention, the wireless charging device equipped with the Bluetooth™ communication protocol module, responds with a preferred position message. In embodiments of the invention, the rechargeable battery-powered Bluetooth™ device responds with a charging requirements message, in accordance with at least one embodiment of the present invention.

FIG. 1D discloses the example network diagram of FIGS. 1A, 1B, and 1C of the wireless charging device commencing providing wireless power to the rechargeable battery-powered Bluetooth™ device, in accordance with at least one embodiment of the present invention.

FIG. 2 discloses an example flow diagram of the overall operation of the wireless charging device equipped with a Bluetooth™ communication protocol module and the rechargeable battery-powered Bluetooth™ device performing the functions shown in FIGS. 1A to 1D, in accordance with at least one embodiment of the present invention.

FIG. 6A illustrates an example embodiment of the invention, wherein pictorial guidance information showing the correct charging location, is included in the information usable for characterizing charging capabilities of the wireless charging device, in accordance with at least one embodiment of the present invention.

FIG. 6B illustrates an example embodiment of the invention, wherein pictorial guidance information showing the appearance of the wireless charging device, is included in the information usable for characterizing charging capabilities of the wireless charging device, in accordance with at least one embodiment of the present invention.

FIG. 6C illustrates an example embodiment of the invention, wherein pictorial guidance information depicting the charger, may be generated from graphical elements or code showing the correct charging location, the graphical elements or code being included in the information usable for characterizing charging capabilities of the wireless charging device, in accordance with at least one embodiment of the present invention.

FIG. 6D illustrates an example embodiment of the invention, wherein pictorial guidance information depicting both the charger and the charged device, may be generated from graphical elements or code showing the correct charging location, the graphical elements or code being included in the information usable for characterizing charging capabilities of the wireless charging device, in accordance with at least one embodiment of the present invention.

FIG. 7A discloses an example alternate network diagram illustrating a wireless charging device equipped with a plurality of antennas used to perform angle of arrival (AoA) estimation when receiving a device detection message from a rechargeable battery-powered Bluetooth™ device, to assist in guiding the rechargeable battery-powered device into a proper position for a wireless charging operation, in accordance with at least one embodiment of the present invention.

DISCUSSION OF EXAMPLE EMBODIMENTS OF THE INVENTION

Figure 1A:
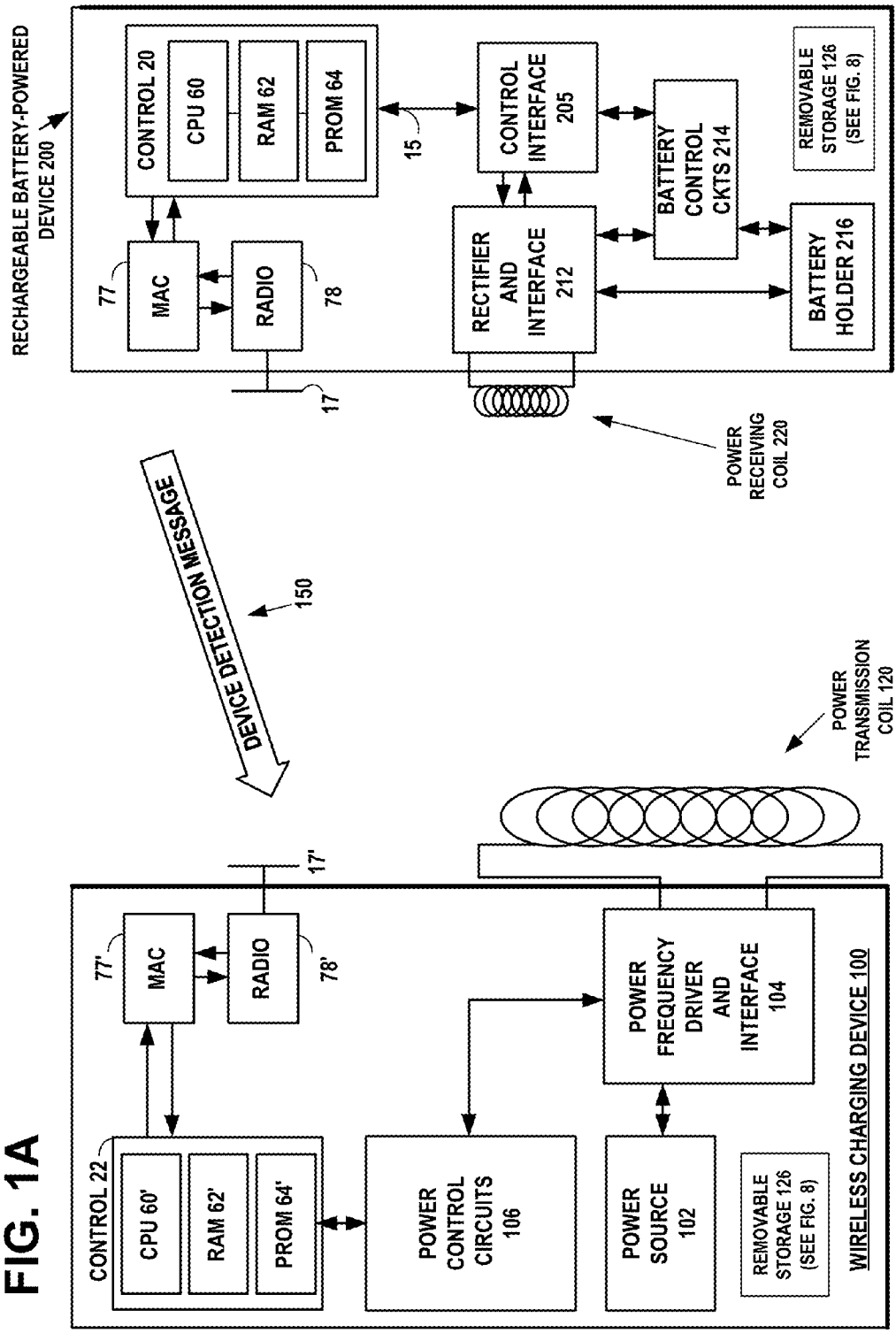
FIG. 1A discloses an example network diagram illustrating a wireless charging device equipped with a Bluetooth™ communication protocol module in inquiry scanning mode receiving an inquiry packet from a rechargeable battery-powered Bluetooth™ device in inquiry mode, in accordance with at least one embodiment of the present invention.

This section is organized into the following topics:
A. Wireless Short-Range Communication Networks
B. Connection Formation Between Bluetooth™ Devices
C. Wireless Charging Technology
D. Wireless Charging Detection A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the *Bluetooth™ Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

1. Inquiry

Inquiry is a procedure where a Bluetooth™ device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. The inquiry response is optional: a device is not forced to respond to an inquiry message. During the inquiry substate, the discovering device collects the Bluetooth™ device addresses and clocks of all devices that respond to the inquiry message. In addition, the discovering device also collects extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and a number of dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels remains passive on that channel until it receives an inquiry message on this channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) data medium rate (DM) packet with type DM1, DM3, DM5, DH1, DH3 or DH5. To minimize interference it is recommended to use the shortest packet that is capable of containing the data. The packet is sent on the same frequency as the (frequency hop synchronization) FHS packet, 1250 microseconds after the start of the FHS packet. In the packet header, the logical transport address (LT_ADDR) may be set to zero. TYPE may be one of DM1, DM3, DM5, DH1, DH3 or DH5. FLOW, ARQN and SEQN may all be set to zero and ignored during receipt. (ARQN is automatic repeat address acknowledgement indication and SEQN is sequential numbering scheme.) The header error check (HEC) linear feedback shift register (LFSR) may be initialized with the same default check initialization (DCI) as for the FHS packet. In the payload header, logical link identifier (LLID) may contain the value 10 (start of an logical link control and adaptation control (L2CAP) message or no fragmentation). FLOW may be set to zero and ignored upon receipt. The length of the payload body (LENGTH) may be smaller than or equal to 240 bytes. The cyclic redundancy check (CRC) linear feedback shift register (LFSR) may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Page

Page is the initial phase of the connection procedure where a device transmits a train of page messages until a response is received from the target device or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address and the clock of the slave device. In the paging procedure, the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Service Discovery Protocol (SDP)

Bluetooth devices are designed to find other Bluetooth devices within their ten meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

Service Discovery Protocol (SDP) is used to allow devices to discover what services each other support, and what parameters to use to connect to them. For example, when connecting a mobile phone to a Bluetooth headset, SDP will be used to determine which Bluetooth profiles are supported by the headset (headset profile, hands free profile, advanced audio distribution profile, etc.) and the protocol multiplexor settings needed to connect to each of them. Each service is identified by a Universally Unique Identifier (UUID), with official services (Bluetooth profiles) assigned a short form UUID (16 bits rather than the full 128).

C. Wireless Charging Technology

Rechargeable batteries in cellular phones and other portable communication devices, such as NiCd, nickel-metal hydride (NIMH), Lithium-ion, and Lithium-Polymer batteries and Super Capacitors, can be recharged with household alternating current (AC) power coupled through a voltage reduction transformer, an alternating-to-direct current converter, and appropriate battery monitoring and charging circuits. They can also be recharged with a 12-volt cigarette lighter socket provided in an automobile coupled through a DC voltage reduction circuit and appropriate battery monitoring and charging circuits. However, in both cases, the portable communication device must be plugged into the household AC power source or into the automobile power source, limiting the mobility of the communication device.

Recently, wireless charging has become available for rechargeable batteries in cellular phones and other portable communication devices, using contact-less electromagnetic induction. A power source circuit in a wireless charging device drives a resonant frequency circuit that produces a source alternating current in a frequency range for example between 50 kHz and 20 MHz, which is driven through a transmitting coil in the charging device. The alternating magnetic field produced by the transmitting coil inductively couples with a corresponding receiving coil in the cellular phone or other portable communication device, thereby producing a corresponding induced alternating current that drives a circuit at its resonant frequency in the range for example between 50 kHz and 20 MHz to produce an output AC voltage. A conversion circuit in the cellular phone or other portable communication device, uses a transformer to adjust the output AC voltage, an alternating-to-direct current converter, and appropriate battery monitoring and charging circuits to produce an appropriate DC charging voltage for the rechargeable battery.

Large sized wireless charging pads have become available to charge rechargeable batteries in multiple portable communication devices, high powered hand tools, domestic appliances, or garden tools using contact-less electromagnetic induction. Wireless charging pads are generally shaped as a flat plate and typically have an active charging surface approximately the size of a sheet of typing paper. Other shapes for the charging pad may not be flat, but instead shaped to conform to particularly shaped user devices to be charged, for example a charger shaped as a wall-mounted holder for a garden tool. Wireless charging pads use multiple transmitting coils or a single large transmitting coil to distribute their magnetic flux over the active charging surface. The mobile device (charged device) may provide control for the charger, particularly indicating desirable power levels and when to stop charging.

There are at least three methods of wireless charging: [1] inductive charging, [2] radio charging, and [3] resonance charging.

Inductive charging may be used for charging mid-sized items such as cell phones, MP3 players and PDAs. In inductive charging, the energy may be transferred from a primary coil to a secondary coil by electromagnetic induction. When a device requires a charge, it is placed on the charging pad, which may be plugged into a socket.

In radio charging, a transmitter, plugged into a socket, generates radio waves. When the receiver, attached to the device to be charged, is set to the same frequency as the transmitter, the transmitter will charge the device's battery.

In resonance charging, a copper coil attached to a power source comprises the sending unit. Another coil, attached to the device to be charged, is the receiver. Both coils are tuned to the same electromagnetic frequency, which makes it possible for energy to be transferred from the sending unit to the device to be charged. The resonance enables charging over a longer distance compared to regular inductive charging.

At least three typical coil alignment strategies are [1] guided positioning with tactile or optical feedback (e.g. a magnet or positioning markers), [2] free positioning using a moving coil, and [3] free positioning using coil array.

At least three techniques may be used by the charger, separately or together, to initially react to a new potentially chargeable device. These are [1] capacitance change (to detect a device), [2] resonance change (to detect device presence and location), and [3] digital ping (to get the desired power levels). The digital ping is also used to detect when the charged device has left the charging area.

D. Wireless Charging Detection

In an example embodiment of the invention, wireless charger existence may be advertised by the wireless charger using a short-range communications protocol. A mobile wireless device using the short-range communications protocol may search for a wireless charger, based on the charged state of the mobile device's battery. The short-range communications protocol may be used to exchange charging information between the wireless charger and the mobile wireless device to be charged. Then, the wireless charger may initialize the charging operation by beginning to feed current to the coils or other similar elements. Using the short-range communications protocol, the charged device is guided to the correct position relative to the other device. The charger keeps periodically checking for the presence of the charged device and discontinues charging when the charged device is no longer detected.

Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of a wireless short-range communication protocol applied to communications between a wireless charger device and a rechargeable battery-powered device.

In an example embodiment of the invention, wireless charger existence may be advertised by the wireless charger using the Bluetooth communications protocol. A mobile wireless device using the Bluetooth communications protocol may search for a wireless charger, based on the charged state of the mobile device's battery. The Bluetooth communications protocol may be used to exchange charging information between the wireless charger and the mobile wireless device to be charged. Then, the wireless charger may initialize the charging operation by beginning to feed current to the coils or other similar elements. Using Bluetooth the charged device is guided to the correct position relative to the other device. The charger keeps periodically checking for the presence of the charged device and discontinues charging when the charged device is no longer detected.

In an example embodiment of the invention, a wireless charger uses the Bluetooth communications protocol to advertise wireless charging capability in a service discovery protocol (SDP) record or an extended inquiry response (EIR) packet. The values of at least one of these fields may be set according to the status of the charger (wireless charging capable/not capable, free/occupied). The Bluetooth communications protocol may be used to exchange information about wireless charging itself (for capable devices) or to send guiding information (e.g. a picture) to the charged device.

FIG. 1A discloses an example network diagram illustrating a wireless charging device 100 equipped with a Bluetooth™ communication protocol module MAC 77' and radio 78' in inquiry scanning mode receiving a device detection message 150, for example an inquiry packet, from a rechargeable battery-powered Bluetooth™ device 200 in inquiry mode, in accordance with at least one embodiment of the present invention. The wireless charging device 100 may provide wireless power 110 to the rechargeable battery-powered device 200.

The rechargeable battery-powered device 200 may be primarily a communications device, such as a cell phone, personal digital assistant (PDA), pager, Bluetooth™ headset, or the like. The rechargeable battery-powered device 200 may also be a personal computing device such as a laptop, palmtop, or tablet computer. The rechargeable battery-powered device 200 may also be an embedded micro-controller in an appliance, an engine control computer, a micro-controller in a digital TV, a micro-controller in a global positioning system (GPS) device, or the like. The rechargeable battery-powered device 200 may also be a video game console or a digital toy, such as a programmable robot.

In an example embodiment, a power source circuit 102 in the wireless charging device 100 drives a power frequency driver and interface 104 that produces a source alternating current in a frequency range between 50 kHz and 20 MHz through the power transmission coil 120, which will provide energy to recharge rechargeable batteries that would be located in the battery holder 216 of the rechargeable battery-powered device 200 during normal use. The power control circuits 106 control the power level output by the charger 100.

In an example embodiment, the power transmission coil 120 of the wireless charging device 100 may be brought near the rechargeable battery-powered device 200 to couple the magnetic flux with the power receiving coil 220, using contact-less electromagnetic induction. The contact-less electromagnetic induction may provide sufficient power to operate the rechargeable battery-powered device 200. In an example embodiment, the power source circuit 102 in the wireless charging device 100 drives a resonant frequency circuit 104 that produces a source alternating current in a frequency range for example between 50 kHz and 20 MHz, which is driven through the transmitting coil 120 in the charging device 100. The alternating magnetic field produced by the transmitting coil 120 inductively couples with the corresponding receiving coil 220 in the rechargeable battery-powered device 200. Both coils may be tuned to the same electromagnetic frequency, enabling energy to be efficiently transferred from the wireless charger device 100 to the rechargeable battery-powered device 200. The resonance enables charging over a longer distance compared to inductive charging. The induced alternating current drives a interface circuit 212 at its resonant frequency in the range for example between 50 kHz and 20 MHz to produce an output AC voltage.

In an example embodiment, the power transmission coil 120 may be any suitable shape such as printed coil, multi-layer coils, wired coils, and the like. In alternate embodiments, a separate printed wiring board 122 may be omitted and the coil 120 may incorporated into the body of the printed wiring board or it may be glued to a plastic substrate forming a charging plate. The power transmission coil 120 may have a relatively large area. The current carrying wires of the power transmission coil 120 generate magnetic field lines that form concentric circles of magnetic flux around the wires 120. The magnetic flux proximate to the power receiving coil 220 of the rechargeable battery-powered device 200, couples with the power receiving coil 220, using contact-less electromagnetic induction. The contact-less electromagnetic induction provides sufficient power to the relatively small power receiving coil 220, to charge rechargeable batteries that would be located in the battery holder 216 of the rechargeable battery-powered device 200 during normal use. The contact-less electromagnetic induction also provides sufficient power to operate the rechargeable battery-powered device 200.

In an example embodiment of the wireless charging device 100, the control 22 may include a central processing unit (CPU) 60', random access memory (RAM) 62', and programmable read only memory (PROM) 64'. The PROM 64' may store programmed instructions.

In example embodiments of the invention, MAC 77 of the rechargeable battery-powered device 200, may use a suitable short-range communications protocol, such as Bluetooth™, Radio Frequency Identification (RFID), Near Field Communication (NFC), Infrared Data Association (IrDA), Ultra Wide Band (UWB), or IEEE 802.11 WLAN, for example, that is respectively wirelessly coupled to a corresponding transceiver of the same type coupled to the software update server.

An example of the Bluetooth™ short-range communications protocol is described, for example, Bluetooth™ devices is described in the Bluetooth™ Specification, Version 4, Jun. 30, 2010, incorporated herein by reference.

An example of the Radio Frequency Identification (RFID) short-range communications protocol is described, for example, ISO 11785 (air interface protocol), ISO 14443 (air interface protocol), and ISO 15693, incorporated herein by reference.

An example of the Near Field Communication (NFC) short-range communications protocol is described, for example, in ISO/IEC 14443 and ISO/IEC 18092, incorporated herein by reference.

An example of the Infrared Data Association (IrDA) short-range communications protocol is described, for example, in IrDA Link Access Protocol, v1.1 (1996), incorporated herein by reference.

An example of the Ultra Wide Band (UWB) short-range communications protocol is described, for example, in WiMedia Common Radio Platform Specification, Version 1.5 (2010), incorporated herein by reference.

An example of the IEEE 802.11 WLAN communications protocol is described, for example, in IEEE 802.11-2007, Wireless Medium Access Control (MAC) and Physical Layer (PHY) Specifications, June 2007 (incorporated herein by reference).

The control processor 20 may include the CPU 60, RAM 62, and PROM 64 that may be coupled to the control interface 205. The CPU 60 may be a dual processor or multi-processor. The PROM 64 may store programmed operations including. In an example embodiment, the control processor 20 may be embodied as a single integrated circuit semiconductor chip, known as a baseband system on chip. In an alternate example embodiment, the control processor 20 may be embodied as two or more integrated circuit semiconductor chips in a chip set. In an example embodiment, the PROM 64 may be a flash memory or other non-volatile computer storage chip that may be electrically erased and reprogrammed.

Figure 8:
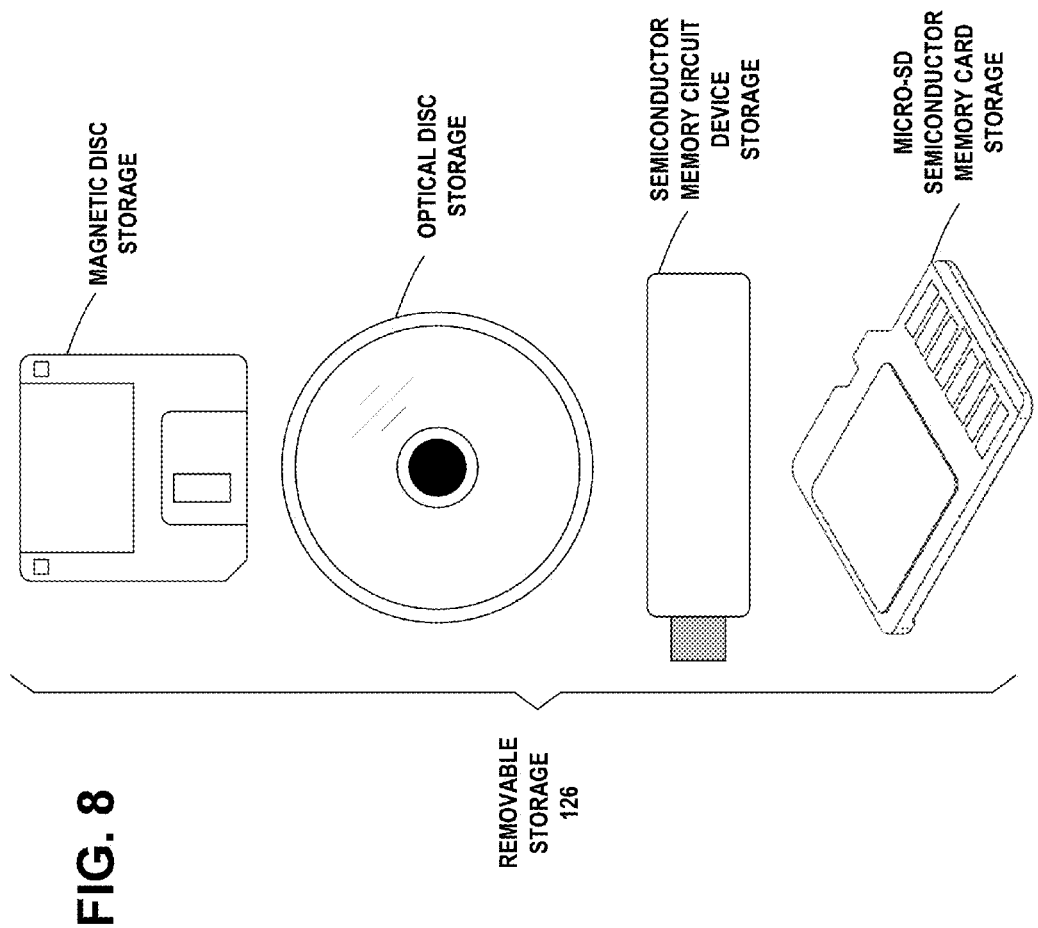
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 8, and may serve, for instance, as a data input/output means. Code may include any interpreted or compiled computer language including computer-executable instructions. The code and/or data may be used to create software modules such as operating systems, communication utilities, user interfaces, more specialized program modules, etc.

In an example embodiment where the rechargeable battery-powered device 200 may be primarily a communications device, such as for example a cell phone, PDA, pager, or Bluetooth™ headset, the control processor 20 may manage the communication functions of the rechargeable battery-powered device 200. Example communication functions may be radio control functions such as signal modulation, encoding, radio frequency shifting, and the like. These communication functions may be based on baseband programming instructions stored as firmware in the PROM 64. In accordance with an example embodiment of the invention, the baseband programming may be wirelessly updated and various settings stored in the control processor 20.

In an alternate example embodiment where the rechargeable battery-powered device 200 may be a laptop, palmtop, or tablet computer, or the like, the control processor 20 may be a microprocessor and its system software may be stored in the PROM 64 as firmware. In accordance with an example embodiment of the invention, the system software may be wirelessly updated and various settings stored in the PROM 64 and/or microprocessor.

In an alternate example embodiment where the rechargeable battery-powered device 200 may be an embedded micro-controller in an appliance, in an engine, in a digital TV, in a video game console, in a programmable robot, or the like, the control processor 20 may be the micro-controller and its system software may be stored in the PROM 64 as firmware. In accordance with an example embodiment of the invention, the system software may be wirelessly updated and various settings stored in the PROM 64 and/or micro-controller.

In an example embodiment of the invention, the control interface 205 in the rechargeable battery-powered device 200 may include stored information, for example, instructions that are output to the control processor 20 in response to detecting the received wireless power 110. The control interface 205 may provide the instructions to the control system 20, transceiver 12, and other needed components of the rechargeable battery-powered device 200.

The inquiry procedure uses dedicated physical channels for the inquiry packet 150 requests and responses. During the inquiry procedure, the rechargeable battery-powered device 200 transmits inquiry packets 150 with the General Inquiry Access Code (GIAC) or Dedicated Inquiry Access Codes (DIAC). The inquiry packet 150 consists of the inquiry access code (IAC) and has a fixed length of 68 bits. The wireless charging device 100 may use a bit correlator to match the received packet 150 to the known bit sequence of packets. The rechargeable battery-powered device 200 repeatedly transmits the inquiry packets 150 at different hop frequencies. The inquiry hop sequence is derived from the Lower Address Part (LAP) of the General Inquiry Access Code (GIAC). Thus, even when Dedicated Inquiry Access Codes (DIACs) are used, the applied hopping sequence is generated from the GIAC LAP.

A wireless charging device 100 that allows itself to be discovered, regularly enters the inquiry scan substate to respond to inquiry packets 150. The inquiry response is optional: a device is not forced to respond to an inquiry packet 150. During the inquiry substate, the rechargeable battery-powered device 200 collects the Bluetooth™ device addresses and clocks of all devices that respond to the inquiry packet 150. In addition, the rechargeable battery-powered device 200 also collects extended information (e.g. local name and supported services) from devices that respond with an extended inquiry response packet 160. The rechargeable battery-powered device 200 may then, if desired, make a connection to any one of the wireless charging devices 100 that has responded, by means of the page procedure. The inquiry packet 150 broadcast by the rechargeable battery-powered device 200 does not contain any information about the rechargeable battery-powered device 200. However, the rechargeable battery-powered device 200 may indicate which class of devices should respond. There is one general inquiry access code (GIAC) to inquire for any device and 63 dedicated inquiry access codes (DIAC) that only inquire for a certain type of device. The inquiry access codes are derived from reserved Bluetooth™ device addresses.

The rechargeable battery-powered device 200 may be, for example, a miniature device such as a key fob, smart card, jewelry, or the like. Wireless charging device 100 may be, for example, a relatively larger cell phone, smart phone, flip-phone, PDA, graphic pad, or even larger devices such as a laptop computer, desktop computer, kitchen appliance, such as a refrigerator, an automobile dashboard, and the like. Typically, the rechargeable battery-powered device 200 will be in the smallest size range that will be limited to a single antenna, due to size constraints, whereas the larger wireless charging device 100 will have lager surface area or volume. However, in embodiments, the relative sizes of devices 100 and 200 may be arbitrary, either one of the devices may be either mobile or fixed-base.

FIG. 2 discloses an example flow diagram 250 of the overall operation of the wireless charging device 100 equipped with a Bluetooth™ communication protocol module 77'/78' and the rechargeable battery-powered Bluetooth™ device 200 equipped with the Bluetooth™ communication protocol module 77/78. The process step 251 shown in the overall flow diagram of FIG. 2, provides for the wireless charging device 100 to perform a preliminary scanning search. The process step 252 shown in the overall flow diagram of FIG. 2, provides for the wireless charging device 100 to advertise its charging services. The details of the wireless charging device 100 performing a preliminary scanning search and initiating advertising for rechargeable battery-powered Bluetooth™ devices is shown in FIG. 3.

Figure 3:
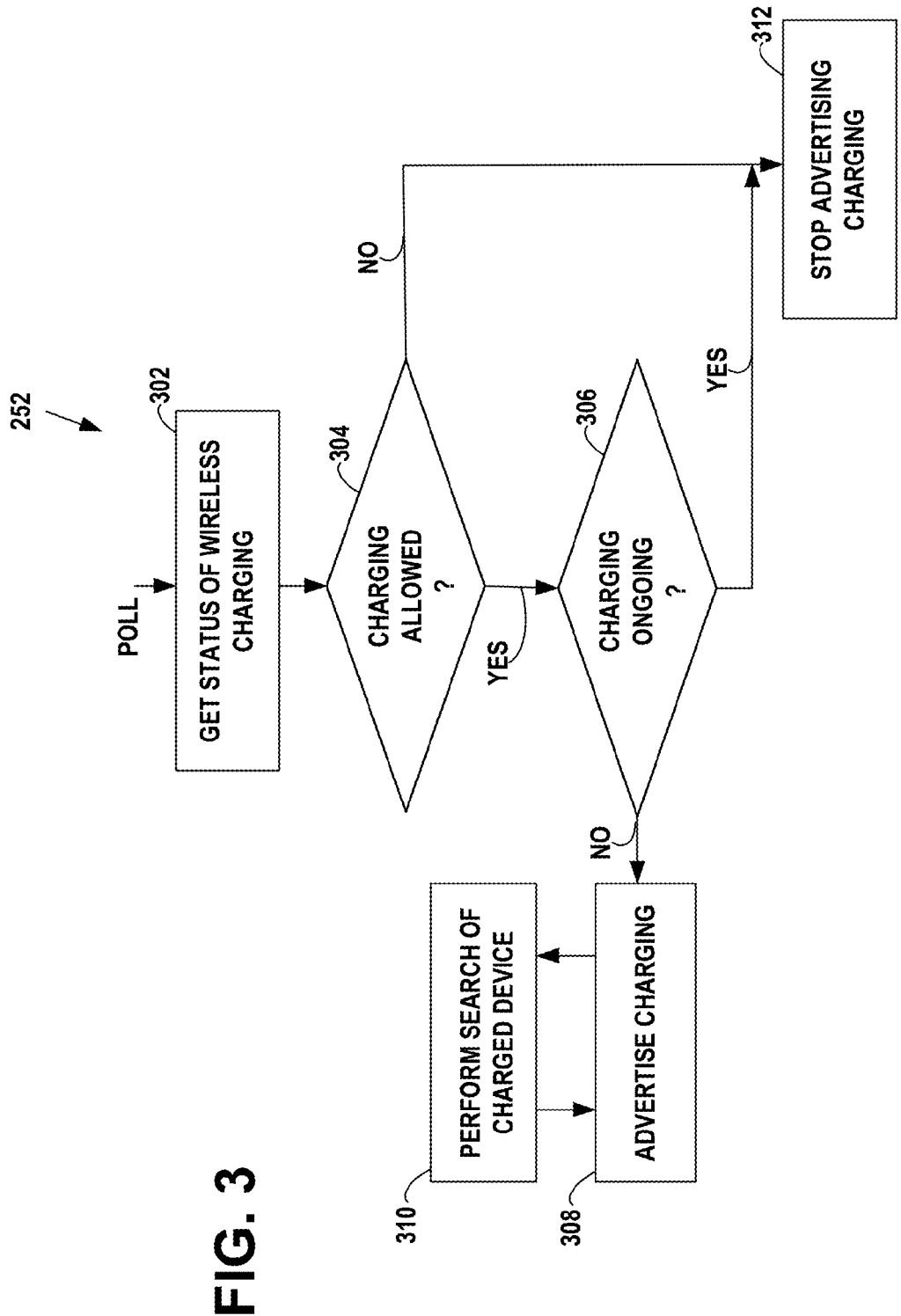
FIG. 3 discloses an example flow diagram of the wireless charger device performing a scanning search for charged devices, in accordance with at least one embodiment of the present invention.

In an example embodiment of the invention, the control 22 in the wireless charging device 100 gets the status of wireless charging in step 302 of FIG. 3. If charging is enabled, as determined in step 304 of FIG. 3, and if there is no ongoing charging operation presently being conducted as determined in step 306, then control 22 in the wireless charging device 100 causes charging to be advertised in step 308, using the Bluetooth™ communication protocol module 77'/78'. In Step 310 of FIG. 3, the Bluetooth™ communication protocol module 77'/78' performs a search for the rechargeable battery-powered Bluetooth™ device 200. This search may be performed on a time-to-time basis.

In an example embodiment of the invention, finding out the status of the wireless charging device 100, such as whether it is enabled or disabled, may cause the wireless charging device 100 to stop advertising, if the charger 100 is disabled, or start the advertising, if the charger 100 is enabled and charging is not currently ongoing. It is also possible that in the "charging enabled" state, a check may be made to determine if the wireless charging device 100 is mains-powered and if it is, then charging may be enabled. When the charging is enabled the wireless charging device 100 may perform a search for the rechargeable battery-powered Bluetooth™ device 200.

The process step 252 shown in the overall flow diagram of FIG. 2, provides for the wireless charging device 100 to advertise its charging services. FIG. 1B1 discloses the example network diagram of FIG. 1A, of the wireless charging device 100 in inquiry scanning mode responding to an inquiry packet 150 from the rechargeable battery-powered Bluetooth™ device 200, by providing information 164 usable for characterizing charging capabilities of the wireless charging device 100. In embodiments of the invention, the wireless charging device 100 in inquiry scanning mode may transmit the extended inquiry response (EIR) packet 160 with the information usable for characterizing charging capabilities of the wireless charging device 164, in a normal Bluetooth™ transmission, in accordance with at least one embodiment of the present invention.

The format of the Bluetooth™ Extended Inquiry Response packet 160 is described in the Bluetooth™ *Core Specification, Version* 4.0. The payload data is 240 octets and has two parts, a significant part followed by a non-significant part. The significant part contains a sequence of data structures, the response data 162 of FIG. 1B1. The non-significant part contains all zero octets. Each data structure 162 will have a length field 165 of one octet, which contains the Length value, and a data field of Length octets.

The first n octets of the data field 162 contain the extended inquiry response (EIR) data type 166, charging capabilities. The content of the remaining EIR Data 164 of has a Length-n octets in the data field and depends on the value of the EIR data type and is called the EIR data. The non-significant part extends the extended inquiry response to 240 octets and will contain all-zero octets. EIR data types 166 may include Service Class Universally Unique Identifier (UUID), Local Name, flag bits, Manufacturer Specific Data, Transmission Power Level, and Secure Simple Pairing Out of Band (OOB). In embodiments of the invention, the EIR data types are expanded to include the Direction Type EIR Data with information useable for characterizing charging capabilities 164. The example fields in the information useable for characterizing charging capabilities 164 may include length 165, charger enabled 168, pictorial guidance information 167, and charger available and/or other information 169, for example including wireless charging capability, status of charger, wireless charging position, charger enabled status, or charger disabled status.

In an example embodiment of the invention, the wireless charger device 100 advertises its wireless charging capability in an extended inquiry response (EIR) packet 160 or a SDP Service Search Attribute Response packet 154. The values of one or more of the fields in the EIR packet or SDP packet may be set according to the status of the wireless charging device 100 (such as wireless charging capable/not capable status, or free/occupied status). The Bluetooth communications protocol may be used to exchange information between charging capable devices concerning the details of the wireless charging or to send guidance information such as a picture, to the rechargeable battery-powered Bluetooth™ device 200.

In an example embodiment of the invention, the one or more wireless communication packets include a Bluetooth™ extended inquiry response packet 160 that includes a data type indication 166 to inform a receiving device that the information usable for characterizing charging capabilities of the wireless charging device exists.

In an example embodiment of the invention, the one or more wireless communication packets include a Bluetooth™ FHS packet 159 including an indication that the information usable for characterizing charging capabilities of the wireless charging device exists in a subsequent packet.

In an example embodiment of the invention, it is also possible to allocate EIR data type for either the wireless charger or the charged device, as shown in Table 1.

TABLE 1

EIR type2

| Type Field (example) | Data type name |
|---|---|
| 0x50 | Wireless Charger capable device |
| 0x51 | Wirelessly Charged capable device |

In an example embodiment of the invention, the Type Field 0x51 indicates that a rechargeable-battery device 200 is able to be wirelessly charged. The device 200 may indicate this property, for example, once the status of its battery is below a certain threshold. The device 200 may indicate this information in an EIR packet. Then the wireless charger device 100, receiving the EIR packet, may find this information by a periodic inquiry, for example, once per 1-5 min. This would indicate to the wireless charging device 100 that there is a device in close proximity (within approximately 10 m), which may be charged wirelessly. The wireless charging device 100 may push charging information into the charged device 200 without that charged device is doing an active search of the wireless charging device 100, which may be beneficial in a low battery situation.

The process step 252 shown in the overall flow diagram of FIG. 2, provides for the wireless charging device 100 to advertise its charging services. FIG. 1B2 discloses an alternate example network diagram of FIG. 1A, of the wireless charging device 100 responding to an SDP Service Search Attribute Request packet 152 from the rechargeable battery-powered Bluetooth™ device 200, by providing a SDP Service Search Attribute Response packet 154 including information usable for characterizing charging capabilities of the wireless charging device 164. In embodiments of the invention, the wireless charging device 100 may transmit the SDP Service Search Attribute Response packet 154 with the information usable for characterizing charging capabilities of the wireless charging device 164, in a normal Bluetooth™ transmission, in accordance with at least one embodiment of the present invention. The formats of the Bluetooth™ SDP Service Search Attribute Request packet 152 and the SDP Service Search Attribute Response packet 154 are described in the Bluetooth™ *Core Specification, Version* 4.0.

The rechargeable battery-powered Bluetooth™ device 200 performs searching and/or browsing for services in the SDP service records in the wireless charging device 100. The wireless charging device 100 has constructed an SDP service registry that stores service records in a browsing hierarchy structured as a tree that may be browsed. The rechargeable battery-powered Bluetooth™ device 200 may begin by examining the public browse root, and then follow the hierarchy out to service classes that are the branches of the tree, and from there to the leaf nodes, where individual services are described in service records. To browse service classes or to get specific information about a service, the rechargeable battery-powered Bluetooth™ device 200 and the wireless charging device 100 exchange messages carried in SDP packets. There are two types of SDP packets discussed here, the SDP Service Search Attribute Request packet 152 and the SDP Service Search Attribute Response packet 154. The SDP Request packet 152 carries the SDP Service Search Attribute Request that includes a service search pattern and an attribute ID list. The service search pattern is the description of the pattern for the wireless charging device 100 to match in its registry. If the wireless charging device 100 has the service requested, it responds with the service's handle. The service handle identifies the service for which the attributes are being requested. The attribute ID list identifies the attributes that the rechargeable battery-powered Bluetooth™ device 200 is requesting. The SDP response packet 154 returned by the wireless charging device 100, carries the SDP Service Search Attribute Response 154 which includes a service record handle list and the attributes. The service record handle list and the attributes are then examined to determine whether the wireless charging device has the required charging capabilities 166. The example fields in the information useable for characterizing charging capabilities 164 may include length 165, charger enabled 168, pictorial guidance information 167, and charger available and/or other information 169, for example including wireless charging capability, status of charger, wireless charging position, charger enabled status, or charger disabled status.

In an example embodiment of the invention, wireless charging services may advertised over in a SDP record. The wireless charging capability is written as a Bluetooth service into the SDP record. This service may provide data connection to exchange wireless charging specific data, such as wireless charging position.

SDP record example (Wireless charger device 100 service as a top of RFCOMM):
  Service Name: Wireless Charger
  Service Class ID List:
    UUID 128: 006b6af0-74c3-11e1-b0c4-0800200c9a66
  Protocol Descriptor List:
    "L2CAP" (0x0100)
    "RFCOMM" (0x0003)
    Channel: 02
  Profile Descriptor List:
    "(0x006b6af0-74c3-11e1-b0c4-0800200c9a66)"

In an example embodiment of the invention, wireless charging requirements may be transmitted by the rechargeable battery-powered Bluetooth™ device 200 back to the wireless charger device 100, in a SDP record. The wireless charging requirements may be written into the SDP record. This SDP record may provide wireless charging specific data, such as present charged status as a percentage of maximum battery capacity.

SDP record example (rechargeable battery-powered Bluetooth device 200; RFCOMM):
  Service Name: Wirelessly Charged device
  Service Class ID List:
    UUID 128: 006b6af0-74c3-11e1-b0c4-0800200c9a69
  Protocol Descriptor List:
    "L2CAP" (0x0100)
    "RFCOMM" (0x0003)
    Channel: 02
  Profile Descriptor List:
    "(0x006b6af0-74c3-11e1-b0c4-0800200c9a69)"

FIG. 1C illustrates the example network diagram of FIGS. 1A and 1B1, after the rechargeable battery-powered Bluetooth™ device 200 has received the extended inquiry response packet 160 including the information usable for characterizing charging capabilities of the wireless charging device 164 and determining that the extended inquiry response packet 160 includes information usable for characterizing charging capabilities of the wireless charging device 164, in accordance with at least one embodiment of the present invention.

The process step 254 shown in the overall flow diagram of FIG. 2, provides for the rechargeable battery-powered Bluetooth™ device 200 to select the wireless charging device 100. Preliminary to performing this step 254, the rechargeable battery-powered Bluetooth™ device 200 determines the charging status of its rechargeable battery, in accordance with at least one embodiment of the present invention. The details of the rechargeable battery-powered Bluetooth™ device 200 determining the charging status of its rechargeable battery is shown in the flow diagram of FIG. 4.

Figure 4:
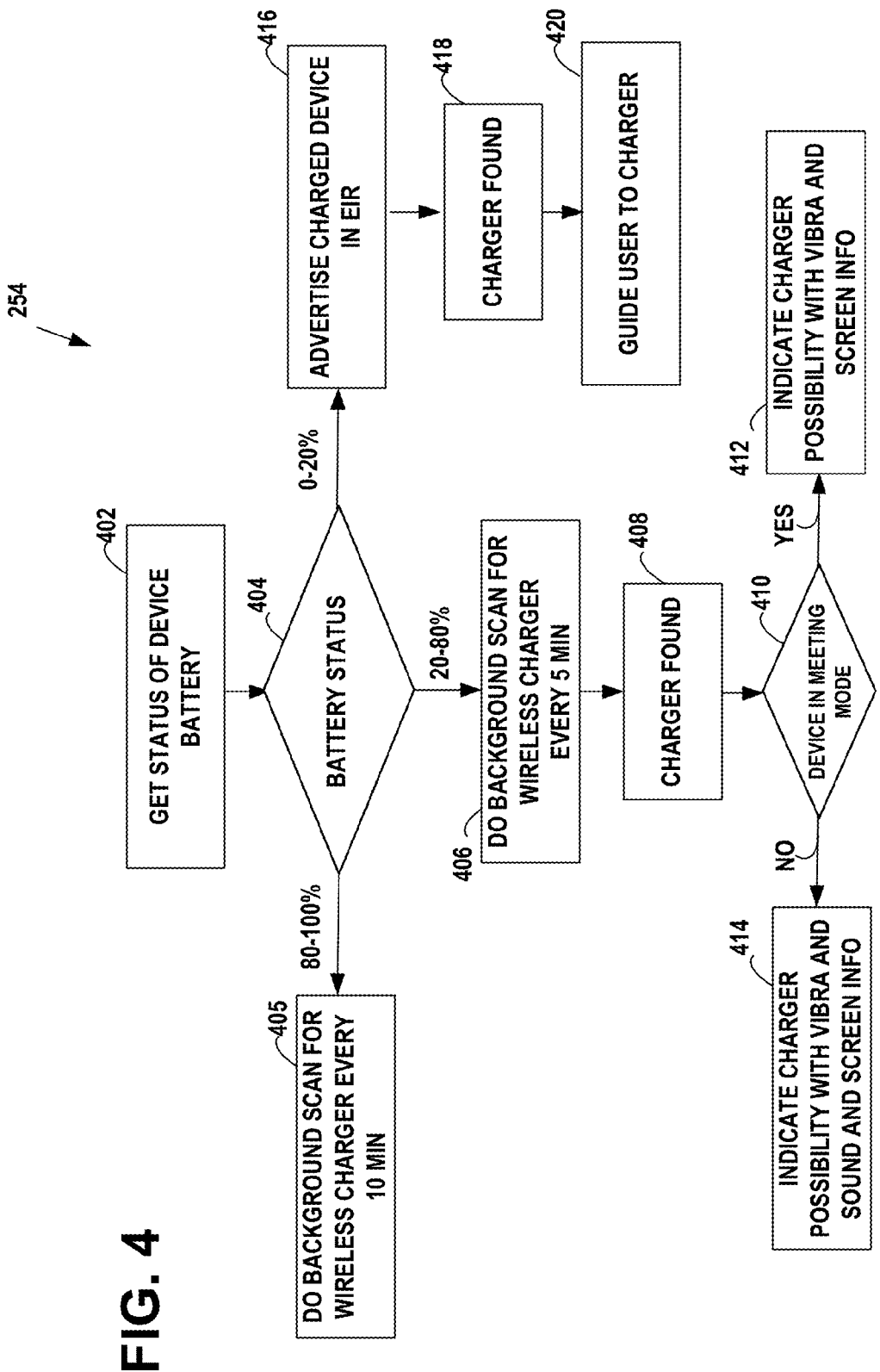
FIG. 4 discloses an example flow diagram of the rechargeable battery-powered Bluetooth™ device determining the charging status of its rechargeable battery, in accordance with at least one embodiment of the present invention.

In an example embodiment of the invention, the control 20 for the rechargeable battery-powered Bluetooth™ device 200, gets the status of its rechargeable battery in step 402 of the flow diagram of FIG. 4. The battery status is determined in step 404. If the battery is presently charged to 80-100% of maximum capacity, then the process proceeds to step 405 where the control 20 causes a background scan to be conducted for a wireless charging device every ten minutes, for example. If the battery is presently charged to 20-80% of maximum capacity, then the process proceeds to step 406 where the control 20 causes a background scan to be conducted for a wireless charging device over a shorter period, for example every five minutes. If a charger is found in step 408, then it is determined in step 410 if the rechargeable battery-powered Bluetooth™ device 200 in the quiet, meeting mode. If the device 200 is in the quiet, meeting mode, then in step 412 a quiet indication by vibration and screen display indicates that a wireless charging device may be available. If the device 200 is not in the quiet, meeting mode, then in step 414 a sound indication along with the by vibration and screen display, indicates that a wireless charging device may be available. If the battery is presently charged to 0-20% of maximum capacity, then the process proceeds to step 416 where the control 20 of the rechargeable battery-powered Bluetooth™ device 200, causes the transmission of an advertisement message to indicate an urgent need for charging. The advertising message may be contained in an extended inquiry response (EIR) packet, a service discovery protocol (SDP) packet.

In an example embodiment of the invention, there may be different behaviors of the rechargeable battery-powered Bluetooth™ device 200, depending on its battery status. In the case where the battery is almost fully charged, the wireless charging device 100 may be searched, for example, once in every 10 min or alternately not searched for at all. If the battery is half full, the searching period may be shorter and when wireless charging device 100 is found, this may be indicated to the user. When battery is almost empty, the rechargeable battery-powered Bluetooth™ device 200 may activate an advertisement that it is in urgent need of recharging, using an EIR packet. When the wireless charging device 100 is found, the user may be actively guided to charge the device. There may also be check, for example, if the device 200 is in meeting mode (its alarms and indications are muted) the detection of the presence of a wireless charging device may be indicated with, for example, vibrate and screen information without sound. With an almost empty battery status, other conditions may be detected to find out if there is beneficial to perform an additional search for a wireless charging device 100, for example by detecting movement of the device 200.

In an example embodiment of the invention, it is also possible that wireless charging device 100 may indicate to the user of the charged device 200 a message or indication "where I am", for example by presenting a sound or light indication on the display of the device 200. This may be user initiated "guidance" or it may also depend on the battery status, such as if the battery charged status is low, then guidance from wireless charging device 100 is given automatically.

The process step 256 shown in the overall flow diagram of FIG. 2, provides for the wireless charging device 100 to calibrate the direction and relative orientation of the coordinate axes of the rechargeable battery-powered Bluetooth™ device 200, in accordance with at least one embodiment of the present invention. The relative orientation of the coordinate axes of the rechargeable battery-powered Bluetooth™ device 200, with respect to the plane of the power transmission coil 120 of the wireless charging device 100, may be determined by the strength of the signals received by the wireless charging device 100. If the antenna 17 of the rechargeable battery-powered Bluetooth™ device 200 is oriented away from the wireless charging device 100 so that the radiation from device 200's antenna 17 is blocked by the bulk of its body, the diminished received signal strength may be used to indicate that the device 200 is incorrectly oriented with respect to the plane of the power transmission coil 120.

The process step 258 shown in the overall flow diagram of FIG. 2, provides for the wireless charging device 100 to transmit a preferred positioning message 172 to the rechargeable battery-powered Bluetooth™ device 200, as shown in FIG. 1C. In embodiments of the invention, the wireless charging device 100 equipped with the Bluetooth™ communication protocol module 77'/78', transmits the preferred position message 172, based on the determined relative orientation of the coordinate axes of the rechargeable battery-powered Bluetooth™ device 200, with respect to the plane of the power transmission coil 120 of the wireless charging device 100.

The process step 260 shown in the overall flow diagram of FIG. 2, provides for the rechargeable battery-powered Bluetooth™ device 200 to transmit its charging requirements message 174 to the wireless charging device 100, as shown in FIG. 1C, in accordance with at least one embodiment of the present invention.

The process step 262 shown in the overall flow diagram of FIG. 2, determines if charging is allowed. If charging is allowed, then step 264 starts the charging, as shown in FIG. 1D. FIG. 1D discloses the example network diagram of FIGS. 1A, 1B, and 1C of the wireless charging device commencing providing wireless power to the rechargeable battery-powered Bluetooth™ device, in accordance with at least one embodiment of the present invention. The relative positions of the devices may be captured in step 266 with a camera and superimposed on the correct charging position that may be shown on the display 174 of the rechargeable battery-powered Bluetooth™ device 200 to facilitate aligning the devices in step 270. If charging is not allowed, the process 250 ends in step 268.

Figure 5A:
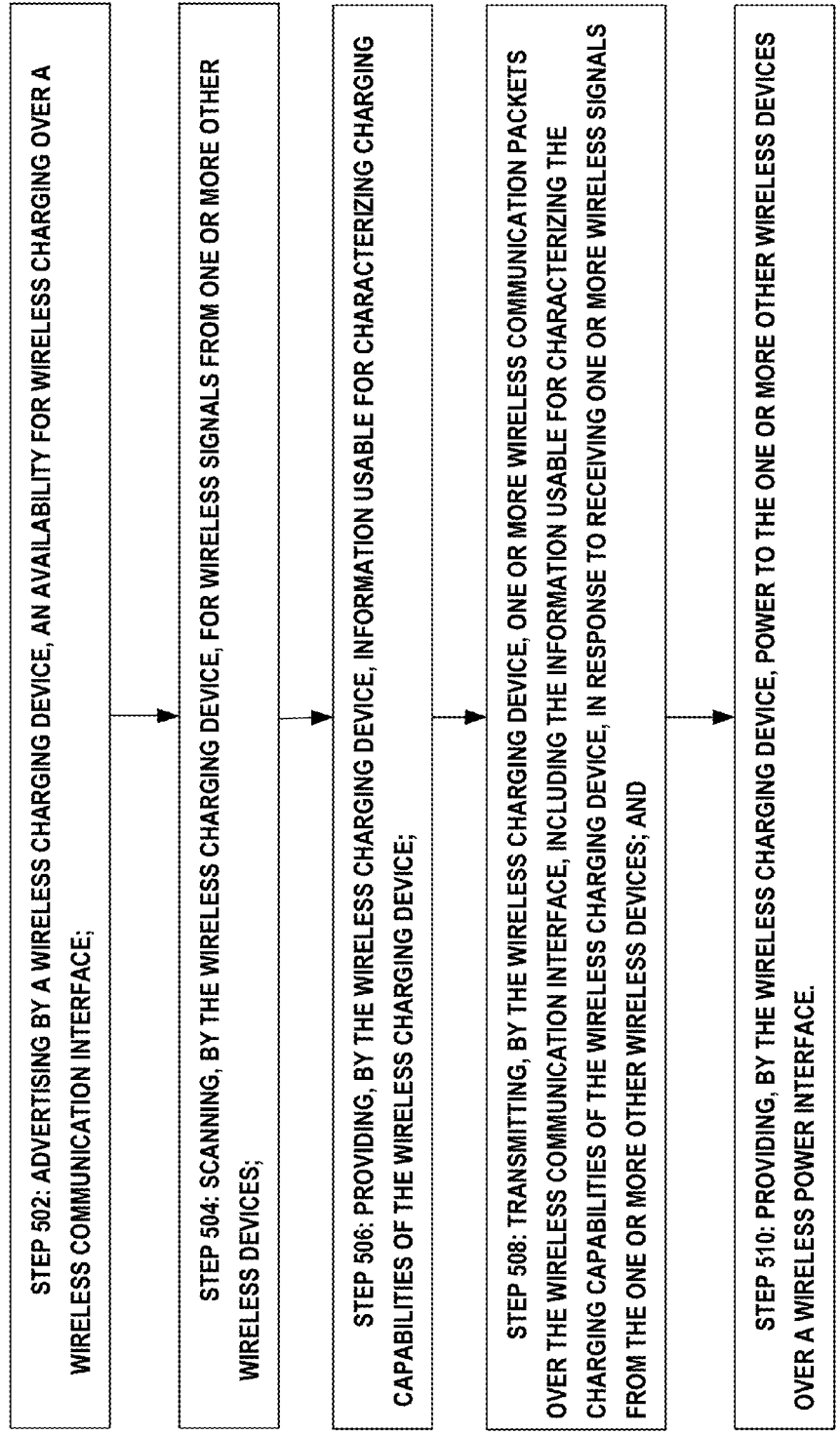
FIG. 5A illustrates an example embodiment of the invention, depicting an example flow diagram of an example method, from the point of view of the wireless charging device, in accordance with at least one embodiment of the present invention.

FIG. 5A illustrates an example embodiment of the invention, depicting an example flow diagram 500 of an example method, from the point of view of the wireless charging device, in accordance with at least one embodiment of the present invention. The steps of the flow diagram represent computer code instructions stored in the RAM and/or ROM memory of the device, which when executed by the central processing units (CPU), carry out the functions of the example embodiments of the invention. The steps may be carried out in another order than shown and individual steps may be combined or separated into component steps. The flow diagram has the following steps:

Step 502: advertising by a wireless charging device, an availability for wireless charging over a wireless communication interface;

Step 504: scanning, by the wireless charging device, for wireless signals from one or more other wireless devices;

Step 506: providing, by the wireless charging device, information usable for characterizing charging capabilities of the wireless charging device;

Step 508: transmitting, by the wireless charging device, one or more wireless communication packets over the wireless communication interface, including the information usable for characterizing the charging capabilities of the wireless charging device, in response to receiving one or more wireless signals from the one or more other wireless devices; and Step 510: providing, by the wireless charging device, power to the one or more other wireless devices over a wireless power interface.

Figure 5B:
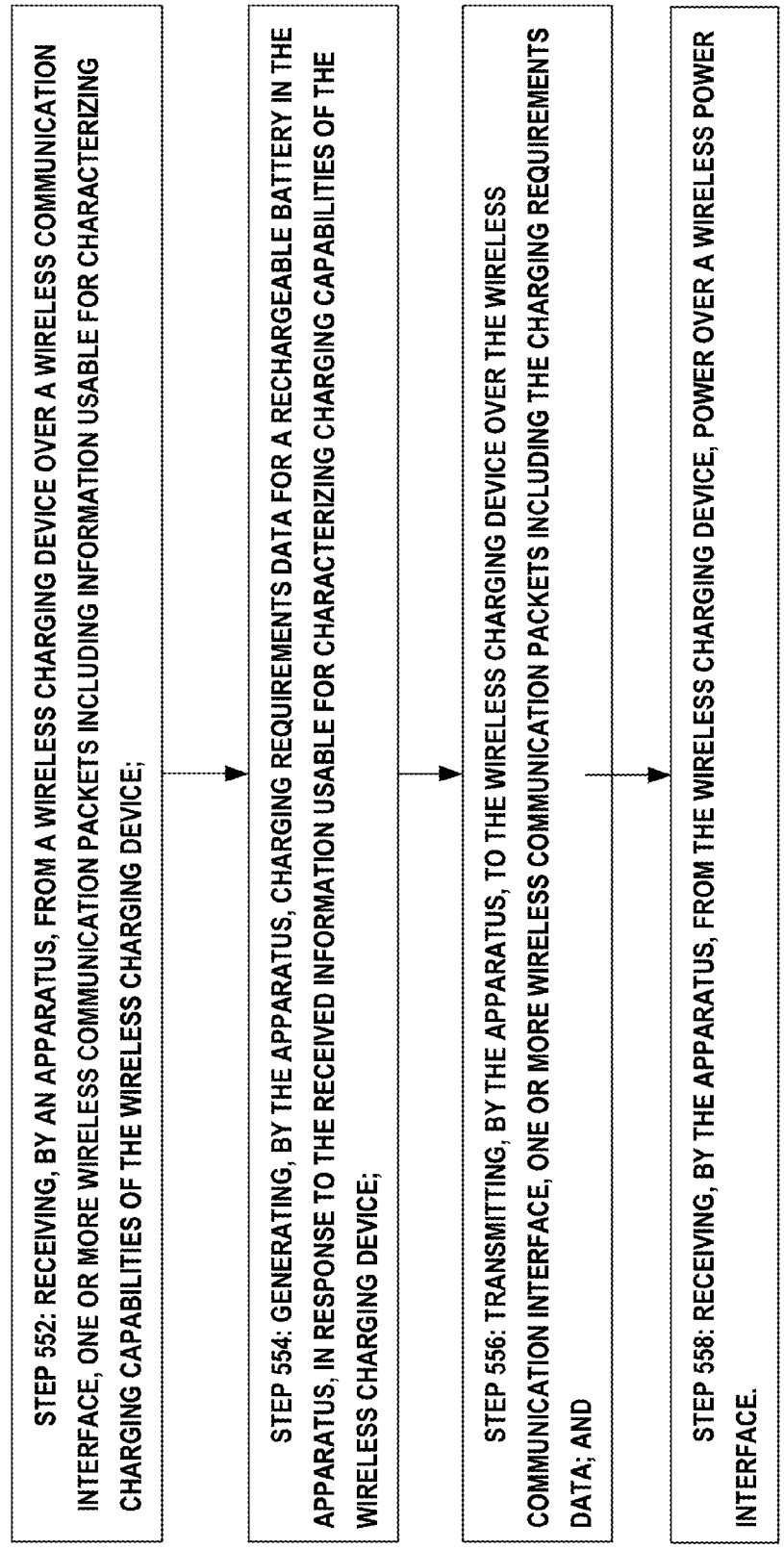
FIG. 5B illustrates an example embodiment of the invention, depicting an example flow diagram of an example method, from the point of view of the rechargeable battery-powered device, in accordance with at least one embodiment of the present invention.

FIG. 5B illustrates an example embodiment of the invention, depicting an example flow diagram 550 of an example method, from the point of view of the rechargeable battery-powered device, in accordance with at least one embodiment of the present invention. The steps of the flow diagram represent computer code instructions stored in the RAM and/or ROM memory of the device, which when executed by the central processing units (CPU), carry out the functions of the example embodiments of the invention. The steps may be carried out in another order than shown and individual steps may be combined or separated into component steps. The flow diagram has the following steps:

Step 552: receiving, by an apparatus, from a wireless charging device over a wireless communication interface, one or more wireless communication packets including information usable for characterizing charging capabilities of the wireless charging device;

Step 554: generating, by the apparatus, charging requirements data for a rechargeable battery in the apparatus, in response to the received information usable for characterizing charging capabilities of the wireless charging device;

Step 556: transmitting, by the apparatus, to the wireless charging device over the wireless communication interface, one or more wireless communication packets including the charging requirements data; and Step 558: receiving, by the apparatus, from the wireless charging device, power over a wireless power interface.

FIG. 6A illustrates an example embodiment of the invention, wherein pictorial guidance information 167 showing the correct charging location, is included in the information usable for characterizing charging capabilities 164 of the wireless charging device 100, in accordance with at least one embodiment of the present invention. In the simplest case, the preferred charging position is always in the same location relative to the charger. In these cases, a static drawing or a photograph suffices.

FIG. 6B illustrates an example embodiment of the invention, wherein pictorial guidance information 167 showing the appearance of the wireless charging device 100, is included in the information usable for characterizing charging capabilities 164 of the wireless charging device 100, in accordance with at least one embodiment of the present invention. A static picture can be surprisingly useful, particularly if the user does not know what to look for. For example, the user is guided to look for a refrigerator.

FIG. 6C illustrates an example embodiment of the invention, wherein pictorial guidance information 167 depicting the wireless charging device 100, may be generated from graphical elements or code showing the correct charging location, the graphical elements or code being included in the information usable for characterizing charging capabilities 164 of the wireless charging device 100, in accordance with at least one embodiment of the present invention. In a more complex case, the positioning or configuration of the charger affects the optimal positioning. This is depicted in FIG. 6C where a laptop is positioned on its side. Sensors (accelerometers) may be used to detect this situation. Other interesting configurations may include the laptop being upside down or its lid open or closed.

FIG. 6D illustrates an example embodiment of the invention, wherein pictorial guidance information 167 depicting both the wireless charging device 100 and the rechargeable battery-powered Bluetooth™ device 200, may be generated from graphical elements or code showing the correct charging location, the graphical elements or code being included in the information usable for characterizing charging capabilities 164 of the wireless charging device 100, in accordance with at least one embodiment of the present invention. The preferred charging position may depend on the positioning of the charger. In this case, the best implementation of the generated picture, containing the charger in its sensed configuration and the corresponding charging position indicator, is a database of pre-created pictures corresponding to all combinations of sensor values. This process is described in FIG. 6D. Alternately, there may be a model of the charger and the preferred charging position, the model being used to render the charger image plus an indicator of their correct orientations.

FIG. 7A discloses an example alternate network diagram illustrating a wireless charging device 100 equipped with a plurality of antennas 17A, 17B, and 17C that may be used to perform angle of arrival (AoA) estimation when receiving the device detection message 150 from the rechargeable battery-powered Bluetooth™ device 200, to assist in guiding the rechargeable battery-powered device 200 into a proper position for wireless charging, in accordance with at least one embodiment of the present invention. In embodiments of the invention, the plurality of antennas 17A, 17B, and 17C of the wireless charging device 100 receive the device communication message 150 from the rechargeable battery-powered Bluetooth™ device 200. The commutating RF switch 73 and the multiplexer 75, under control of the control 22, sequentially connect each of the antennas 17A, 17B, and 17C to the radio 78', to enable the control 22 to estimate the angle of arrival (AoA) when receiving the device detection message 150 from the rechargeable battery-powered Bluetooth™ device. The estimated the angle of arrival (AoA) may be used to assist in guiding the rechargeable battery-powered device 200 into a proper position for wireless charging, by the wireless charging device 100.

The angle of arrival (AoA) of the signals received by the wireless charging device 100 from the rechargeable battery-powered Bluetooth™ device 200 may be determined by the array of antennas 17A, 17B, and 17C with a normal axis arranged on the wireless charging device 100. A normal axis perpendicular to a linear axis defines a plane with the linear antenna array. The apparent direction of reception of a signal by the linear antenna array, as seen from the rechargeable battery-powered Bluetooth™ device 200 occupying the plane, may be represented by an observation vector. The angle between the observation vector and the normal axis is defined as the angle of arrival (AoA) of the signal as it approaches the antenna array. In embodiments, the antenna array 17A, 17B, and 17C may be arranged on the wireless charging device 100 in a two-dimensional array in a plane and the normal axis is perpendicular to the plane of the antenna array. In this arrangement, the angle of arrival (AoA) is similarly defined as the angle between the observation vector and the normal axis to the plane. In embodiments, the antenna array 17A, 17B, and 17C may be arranged in any arbitrary manner, either in a linear array, a two-dimensional array, or a three dimensional array. A different number of antennas may be employed, than the three shown.

FIG. 7A illustrates the wireless charging device 100 equipped with a sensor 720 to sense whether the lid of the charging device 100 is open or closed, such as in a laptop computer. If, for example, the lid is closed, the rechargeable battery-powered device 200 will have limited access to the power transmission coil 120 for charging. In accordance with an example embodiment of the invention, the present state of the lid being open or closed will be sensed by the sensor 720 and the control 22 will access an appropriate pictorial guidance picture from its memory. Alternately, a pointer may be accessed that points to such a picture in a database accessible by the rechargeable battery-powered device 200. The pictorial guidance picture or the pointer is inserted into a wireless communication message that is sent by the wireless charging device 100 to the rechargeable battery-powered device 200 for display of the picture to the user, to assist the user in guiding the rechargeable battery-powered device 200 into a proper position for wireless charging, in accordance with at least one embodiment of the present invention.

FIG. 7A illustrates the wireless charging device 100 equipped with a sensor 730 to sense the orientation of the charging device 100 as resting right-side up, on its left or right side, or upside down, such as for a laptop computer embodying the charging device 100. If, for example, the power transmission coil 120 is located on the bottom surface of the laptop computer, and if the orientation of the laptop computer is resting right-side up, then the rechargeable battery-powered device 200 will have limited access to the power transmission coil 120 for charging. In accordance with an example embodiment of the invention, the present orientation of the wireless charging device 100 will be sensed by the sensor 730 and the control 22 will access an appropriate pictorial guidance picture from its memory. Alternately, a pointer may be accessed that points to such a picture in a database accessible by the rechargeable battery-powered device 200. The pictorial guidance picture or the pointer is inserted into a wireless communication message that is sent by the wireless charging device 100 to the rechargeable battery-powered device 200 for display of the picture to the user, to assist the user in guiding the rechargeable battery-powered device 200 into a proper position for wireless charging, in accordance with at least one embodiment of the present invention.

Figure 7B:
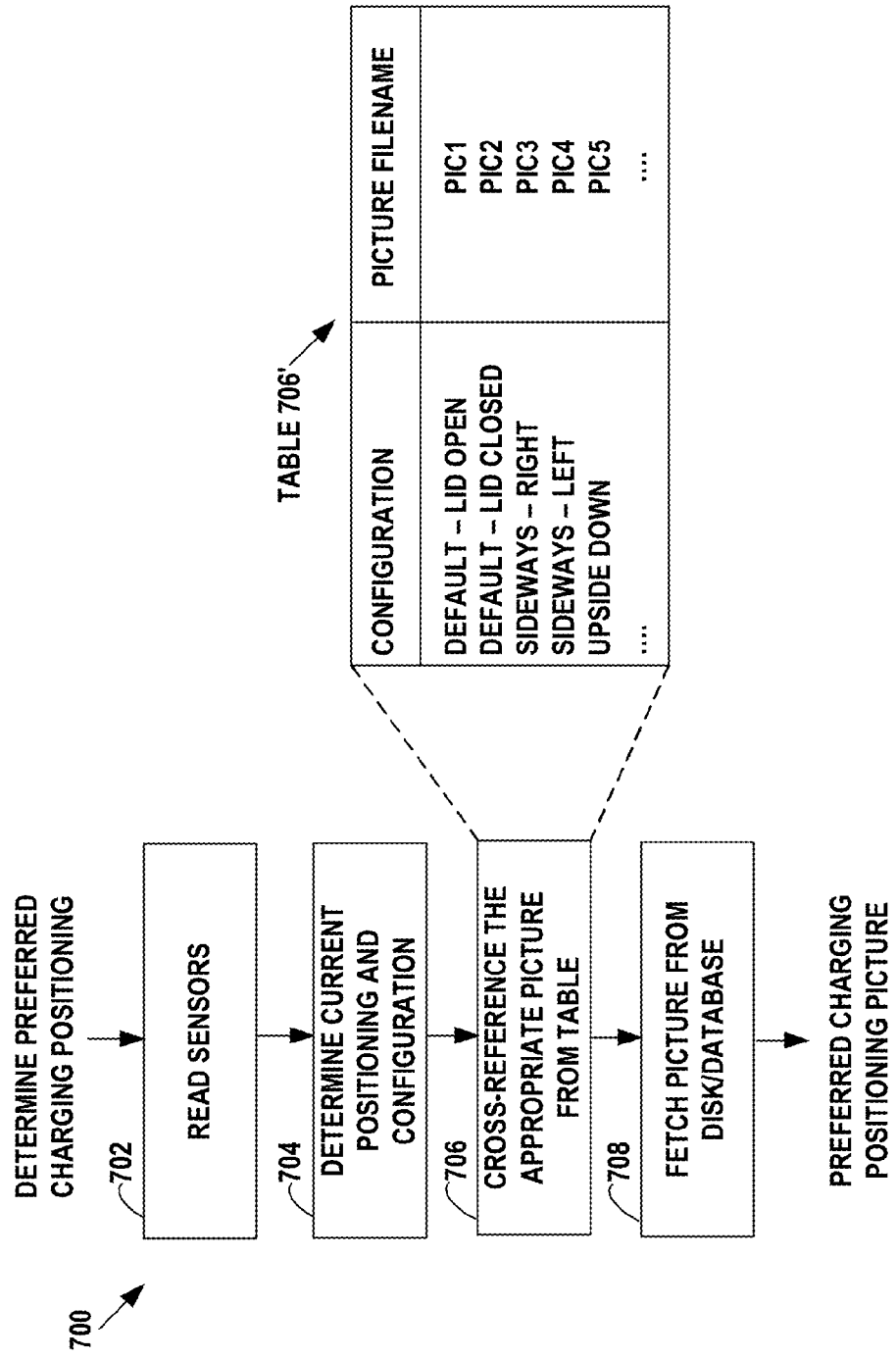
FIG. 7B discloses an example flow diagram of the wireless charger device determining a preferred charging position for a rechargeable battery-powered Bluetooth™ device, in accordance with at least one embodiment of the present invention.

FIG. 7B discloses an example flow diagram 700 of the wireless charger device 100 determining a preferred charging position for a rechargeable battery-powered Bluetooth™ device 200, in accordance with at least one embodiment of the present invention. FIG. 7B shows a database lookup-based generation of guidance pictures. It is also possible that the charged device orientation affects the efficiency of charging. In that case, a model rendering method may be used to depict the guidance to a preferred charging position. The charger model may be augmented with a charged device model, as shown in FIG. 6D. The forming of the image may be rendered on either of the wireless charging device 100 or rechargeable battery-powered device 200 or in a server.

In an example embodiment of the invention, flow diagram 700 of the process performed by the of the wireless charger device 100 begins at step 702 to read sensors, for example as to whether the laptop lid is open for a wireless charger device 100 incorporated in a laptop. Step 704 determines the current positioning and configuration, such as the open or closed condition of the lid and the relative location of the device 200 to be charged, such as whether the laptop is on its side or upside down with respect to the location of the device to be charged. Step 706 cross references the appropriate pictorial guidance picture from the table 706', such as "lid open", "lid closed", "sideways-right", "sideways-left", "upside down", etc. Then, step 708 fetches the guidance picture from a disk or database for display to the user, for example on the display 174 of the rechargeable battery-powered Bluetooth™ device 200. In accordance with an example embodiment of the invention, the wireless charging device 100 will access an appropriate pictorial guidance picture from its memory. Alternately, a pointer may be accessed that points to such a picture in a database accessible by the rechargeable battery-powered device 200. The pictorial guidance picture or the pointer is inserted into a wireless communication message that is sent by the wireless charging device 100 to the rechargeable battery-powered device 200 for display of the picture to the user, to assist the user in guiding the rechargeable battery-powered device 200 into a proper position for wireless charging, in accordance with at least one embodiment of the present invention.

Detecting the presence of the charged device using a radio technology may be important to avoid premature stopping of the charging in cases such as the user moves the device a bit or answers a phone call. Using Bluetooth, for example, enables the communication to be maintained over longer distances. Thus, control packets may flow even if the devices are not in immediate contact with each other. This may be useful, for example, in foreign object detection, where the charged device may inform the charger that something actually has happened and the charger should expect the power loss to change. In addition, charging authentication may be maintained with Bluetooth in cases where the charged device has been moved.

FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, an apparatus comprises:

means for advertising by a wireless charging device, an availability for wireless charging over a wireless communication interface;

means for scanning, by the wireless charging device, for wireless signals from one or more other wireless devices;

means for providing, by the wireless charging device, information usable for characterizing charging capabilities of the wireless charging device;

means for transmitting, by the wireless charging device, one or more wireless communication packets over the wireless communication interface, including the information usable for characterizing the charging capabilities of the wireless charging device, in response to receiving one or more wireless signals from the one or more other wireless devices; and means for providing, by the wireless charging device, power to the one or more other wireless devices over a wireless power interface.

In an example embodiment of the invention, an apparatus comprises:

means for receiving, by an apparatus, from a wireless charging device over a wireless communication interface, one or more wireless communication packets including information usable for characterizing charging capabilities of the wireless charging device;

means for generating, by the apparatus, charging requirements data for a rechargeable battery in the apparatus, in response to the received information usable for characterizing charging capabilities of the wireless charging device;

means for transmitting, by the apparatus, to the wireless charging device over the wireless communication interface, one or more wireless communication packets including the charging requirements data; and means for receiving, by the apparatus, from the wireless charging device, power over a wireless power interface.

The resulting invention enables wireless charging detection.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

advertising by a wireless charging device, an availability for wireless charging over a wireless communication interface;

scanning, by the wireless charging device, for wireless signals from one or more other wireless devices to be charged;

determining, by the wireless charging device, a direction and relative orientation of one or more other wireless devices to be charged, based on wireless signals received from the one or more other wireless devices to be charged;

providing, by the wireless charging device, a data field for characterizing charging capabilities of the wireless charging device, including pictorial guidance information comprising a graphical representation selected from a plurality of graphical representations based on the determined relative orientation of the one or more other wireless devices to be charged, of appearance of both the wireless charging device and the one or more other wireless devices to be charged, from graphical elements or code showing correct charging location;

transmitting, by the wireless charging device, one or more wireless communication packets over the wireless communication interface to the one or more other wireless devices to be charged, including the data field for characterizing the charging capabilities of the wireless charging device, in response to receiving one or more wireless signals from the one or more other wireless devices; and providing, by the wireless charging device, power to the one or more other wireless devices over a wireless power interface.

2. The method of claim 1, further comprising:

determining, by the wireless charging device, whether charging is available in the wireless charging device; and discontinuing said advertising, in response to determining that charging is at least temporarily unavailable.

3. The method of claim 1, wherein the one or more wireless communication packets include a Bluetooth extended inquiry response packet.

4. The method of claim 1, wherein the one or more wireless communication packets include a Bluetooth service discovery protocol packet.

5. The method of claim 1, wherein the one or more wireless communication packets include a Bluetooth extended inquiry response packet that includes a data type indication to inform a receiving device that the data field for characterizing charging capabilities of the wireless charging device exists.

6. The method of claim 1, wherein the one or more wireless communication packets include a Bluetooth FHS packet including an indication that the data field for characterizing charging capabilities of the wireless charging device exists in a subsequent packet.

7. The method of claim 1, wherein the data field for characterizing charging capabilities of the wireless charging device includes one or more of wireless charging capability, status of charger, pictorial guidance information, wireless charging position, charger enabled status, or charger disabled status.

8. A method, comprising:
receiving, by an apparatus, from a wireless charging device over a wireless communication interface, one or more wireless communication advertising packets including a data field for characterizing charging capabilities of the wireless charging device, wherein the data field for characterizing charging capabilities of the wireless charging device includes pictorial guidance information comprising a graphical representation selected from a plurality of graphical representations based on a determined relative orientation of the apparatus with respect to the wireless charging device based on wireless signals received by the wireless charging device from the apparatus, of appearance of both the wireless charging device and the apparatus showing a correct charging location;
generating, by the apparatus, charging requirements data for a rechargeable battery in the apparatus, in response to the received data field for characterizing charging capabilities of the wireless charging device;
displaying, by the apparatus, the pictorial guidance information comprising representations of appearance of both the wireless charging device and the apparatus showing a correct charging location;
transmitting, by the apparatus, to the wireless charging device over the wireless communication interface, one or more wireless communication packets including the charging requirements data; and
receiving, by the apparatus, from the wireless charging device, power over a wireless power interface.

9. The method of claim 8, further comprising:
scanning, by the apparatus, for wireless communication signals indicating presence of a wireless charging device, at a scanning rate based on a charged state of the rechargeable battery in the apparatus.

10. The method of claim 8, further comprising:
transmitting, by the apparatus, wireless advertising signals requesting service by a wireless charging device, when the charged state of the rechargeable battery in the apparatus is less than a threshold value.

11. The method of claim 8, further comprising:
displaying, by the apparatus, guidance for positioning the apparatus with respect to the wireless charging device, based on the data field for characterizing charging capabilities of the wireless charging device.

12. The method of claim 8, wherein the one or more wireless communication packets including the data field for characterizing charging capabilities of the wireless charging device includes a Bluetooth extended inquiry response packet.

13. The method of claim 8, wherein the one or more wireless communication packets including the data field for characterizing charging capabilities of the wireless charging device includes a Bluetooth service discovery protocol packet.

14. The method of claim 8, wherein the one or more wireless communication packets including the data field for characterizing charging capabilities of the wireless charging device includes a Bluetooth extended inquiry response packet that includes a data type indication to inform the apparatus that the data field for characterizing charging capabilities of the remote device exists.

15. The method of claim 8, wherein the data field for characterizing charging capabilities of the wireless charging device includes one or more of wireless charging capability, status of charger, pictorial guidance information, wireless charging position, charger enabled status, or charger disabled status.

16. An apparatus, comprising:
at least one processor;
at least one memory including computer program code;
the at least one memory and the computer program code configured to, with the at least one processor, cause the apparatus at least to:
advertise an availability for wireless charging over a wireless communication interface;
scan for wireless signals from one or more other wireless devices to be charged;
determine a direction and relative orientation of one or more other wireless devices to be charged, based on wireless signals received from the one or more other wireless devices to be charged;
provide a data field for characterizing charging capabilities of the wireless charging device, including pictorial guidance information comprising a graphical representation selected from a plurality of graphical representations based on the determined relative orientation of the one or more other wireless devices to be charged, of appearance of both the wireless charging device and the one or more other wireless devices to be charged, from graphical elements or code showing correct charging location;
transmit one or more wireless communication packets over the wireless communication interface to the one or more other wireless devices to be charged, including the data field for characterizing the charging capabilities of the wireless charging device, in response to receiving one or more wireless signals from the one or more other wireless devices; and
provide power to the one or more other wireless devices over a wireless power interface.

17. The apparatus of claim 16, further comprising:
the at least one memory and the computer program code configured to, with the at least one processor, cause the apparatus at least to:
determine whether charging is available in the apparatus; and
discontinue said advertising, in response to determining that charging is at least temporarily unavailable.

18. An apparatus, comprising:
at least one processor;
at least one memory including computer program code;
the at least one memory and the computer program code configured to, with the at least one processor, cause the apparatus at least to:
receive from a wireless charging device over a wireless communication interface, one or more wireless communication advertising packets including a data field for characterizing charging capabilities of the wireless charging device, wherein the data field for characterizing charging capabilities of the wireless charging device includes pictorial guidance information comprising a graphical representation selected from a plurality of graphical representations based on a determined relative orientation of the apparatus with respect to the wireless charging device based on wireless signals received by the wireless charging device from the apparatus, of appearance of both the wireless charging device and the apparatus showing a correct charging location;
generate charging requirements data for a rechargeable battery in the apparatus, in response to the received data field for characterizing charging capabilities of the wireless charging device;
display the pictorial guidance information comprising representations of appearance of both the wireless charging device and the apparatus showing a correct charging location;
transmit to the wireless charging device over the wireless communication interface, one or more wireless communication packets including the charging requirements data; and
receive from the wireless charging device, power over a wireless power interface.

19. The apparatus of claim 18, further comprising:
the at least one memory and the computer program code configured to, with the at least one processor, cause the apparatus at least to:
scan for wireless communication signals indicating presence of a wireless charging device, at a scanning rate based on a charged state of the rechargeable battery in the apparatus.

20. The apparatus of claim 18, further comprising:
the at least one memory and the computer program code configured to, with the at least one processor, cause the apparatus at least to:
transmit wireless advertising signals requesting service by a wireless charging device, when the charged state of the rechargeable battery in the apparatus is less than a threshold value.

21. The apparatus of claim 18, further comprising:
the at least one memory and the computer program code configured to, with the at least one processor, cause the apparatus at least to:
display guidance for positioning the apparatus with respect to the wireless charging device, based on the data field for characterizing charging capabilities of the wireless charging device.

22. A computer program product comprising computer executable program code recorded on a computer readable non-transitory storage medium, the computer executable program code comprising:
code for advertising, by a wireless charging device, an availability for wireless charging over a wireless communication interface;
code for scanning, by the wireless charging device, for wireless signals from one or more other wireless devices to be charged;
code for determining, by the wireless charging device, a direction and relative orientation of one or more other wireless devices to be charged, based on wireless signals received from the one or more other wireless devices to be charged;
code for providing, by the wireless charging device, a data field for characterizing charging capabilities of the wireless charging device, including pictorial guidance information comprising a graphical representation selected from a plurality of graphical representations based on the determined relative orientation of the one or more other wireless devices to be charged, of appearance of both the wireless charging device and the one or more other wireless devices to be charged, from graphical elements or code showing correct charging location;
code for transmitting, by the wireless charging device, one or more wireless communication packets over the wireless communication interface to the one or more other wireless devices to be charged, including the data field for characterizing the charging capabilities of the wireless charging device, in response to receiving one or more wireless signals from the one or more other wireless devices; and
code for providing, by the wireless charging device, power to the one or more other wireless devices over a wireless power interface.

23. A computer program product comprising computer executable program code recorded on a computer readable non-transitory storage medium, the computer executable program code comprising:
code for receiving, by an apparatus, from a wireless charging device over a wireless communication interface, one or more wireless communication advertising packets including a data field for characterizing charging capabilities of the wireless charging device, wherein the data field for characterizing charging capabilities of the wireless charging device includes pictorial guidance information comprising a graphical representation selected from a plurality of graphical representations based on a determined relative orientation of the apparatus with respect to the wireless charging device based on wireless signals received by the wireless charging device from the apparatus, of appearance of both the wireless charging device and the apparatus showing a correct charging location;
code for generating, by the apparatus, charging requirements data for a rechargeable battery in the apparatus, in response to the received data field for characterizing charging capabilities of the wireless charging device;
code for displaying, by the apparatus, the pictorial guidance information comprising representations of appearance of both the wireless charging device and the apparatus showing a correct charging location;
code for transmitting, by the apparatus, to the wireless charging device over the wireless communication interface, one or more wireless communication packets including the charging requirements data; and
code for receiving, by the apparatus, from the wireless charging device, power over a wireless power interface.

* * * * *